(12) United States Patent
Fuse

(10) Patent No.: US 11,194,129 B2
(45) Date of Patent: Dec. 7, 2021

(54) CORRECTION LENS AND IMAGING APPARATUS

(71) Applicant: TAMRON CO., LTD., Saitama (JP)

(72) Inventor: Shingo Fuse, Saitama (JP)

(73) Assignee: TAMRON CO., LTD., Saitama (JP)

( * ) Notice: Subject to any disclaimer, the term of this patent is extended or adjusted under 35 U.S.C. 154(b) by 134 days.

(21) Appl. No.: 16/665,374

(22) Filed: Oct. 28, 2019

(65) Prior Publication Data
US 2020/0132970 A1 Apr. 30, 2020

(30) Foreign Application Priority Data
Oct. 31, 2018 (JP) .............................. JP2018-205610

(51) Int. Cl.
G02B 13/00 (2006.01)
G02B 9/64 (2006.01)

(52) U.S. Cl.
CPC ............ G02B 13/0045 (2013.01); G02B 9/64 (2013.01)

(58) Field of Classification Search
CPC ........ G02B 13/0045; G02B 9/64; G02B 3/06; G02B 27/0025–0031
See application file for complete search history.

(56) References Cited

U.S. PATENT DOCUMENTS

| 4,705,343 | A | * | 11/1987 | Simons | .......... G02B 15/144105 359/354 |
| 5,526,181 | A | * | 6/1996 | Kunick | .............. G02B 27/0025 244/3.16 |
| 6,310,730 | B1 | * | 10/2001 | Knapp | .................. F41G 7/2213 244/3.17 |
| 6,356,396 | B1 | | 3/2002 | Chen et al. | |

FOREIGN PATENT DOCUMENTS

| CN | 106054381 A | * | 10/2016 |
| CN | 107656368 A | * | 2/2018 |
| JP | 2004-508575 A | | 3/2004 |

* cited by examiner

Primary Examiner — Wen Huang
(74) Attorney, Agent, or Firm — Paratus Law Group, PLLC

(57) ABSTRACT

A correction lens is used in an optical system in which a light-transmissive cover member having radii of curvature different from each other in a predetermined first direction and a second direction perpendicular to the first direction is disposed on an object side. Radii of curvature of an image-side surface of the correction lens are different in the first direction and the second direction, and satisfy a predetermined condition.

7 Claims, 27 Drawing Sheets

CORRECTION LENS AND IMAGING APPARATUS

CROSS-REFERENCE TO RELATED APPLICATIONS

This application is based on and claims the benefit of priority from Japanese Patent Application No. 2018-205610, filed on Oct. 31, 2018, the entire contents of which are incorporated herein by reference.

BACKGROUND OF THE INVENTION

Technical Field

The present invention relates to a correction lens and an imaging apparatus, and particularly, to a correction lens that corrects a shift between a focal position of a first direction component and a focal position of a second direction component on a plane perpendicular to an optical axis in light incident on an optical system, and an imaging apparatus including the correction lens.

Related Art

In related art, various driving support systems such as a collision avoidance system and a lane departure warning system are realized. In order to realize these systems, various imaging apparatuses such as a view camera that images an image for assisting a visual field of a driver, a sensing camera that obtains an image for image analysis for detecting traffic signs or lanes, and a Time Of Flight (TOF) camera that obtains a distance image for detecting a distance from a preceding vehicle or an obstacle in the surroundings are used. Among these imaging apparatus, light detection and ranging (LiDAR) has attracted attention in recent years. LiDAR is a type of TOF camera, and can obtain a distance image indicating a direction in which an object is present and a distance from the object by emitting pulsed light of a predetermined wavelength toward a space and receiving reflection light reflected from the object.

However, there are many cases where various imaging apparatuses are mounted on the outside of the vehicle. Thus, in order to protect an optical system of the imaging apparatus from dirt and scratches, a light-transmissive cover member is provided on an object side of the optical system. The imaging apparatus is not limited to an in-vehicle imaging apparatus, and is also applied to a surveillance imaging apparatus used for establishing a security system.

When the light-transmissive cover member is formed in a shape having a curvature such as a dome shape, the light-transmissive cover member has a refractive power. Thus, when light is incident on the optical system through the light-transmissive cover member, a focal position of the incident light may be shifted from an ideal image plane. Thus, in these imaging apparatuses, a light correction device is disposed between the light-transmissive cover member and the optical system, and a shift in focal position caused by the light-transmissive cover member is corrected (for example, see JP 2004-508575 A).

In recent years, in order to realize future autonomous vehicles, the surroundings of the vehicle are sensed by a scanning type LiDAR of a machine rotation type. In such a LiDAR, the optical system is rotatably stored on the inside of the light-transmissive cover member having the cylindrical shape. Here, when a direction of an optical axis of the optical system is a Z direction, a first direction perpendicular to the optical axis is an X direction, and a second direction perpendicular to the optical axis and the first direction is a Y direction, the light-transmissive cover member having the cylindrical shape has different curvatures in the X direction and the Y direction. Thus, there is a shift between a focal position of an X direction component and a focal position of a Y direction component in light incident through the light-transmissive cover member, and thus, the direction in which the object is present and the distance from the object may not be able to be detected with high accuracy. The light correction device described in JP 2004-508575 A is effective for the light-transmissive cover member having the same curvature in the X direction and the Y direction, but is not able to correct the shift in the focal position for the light-transmissive cover member having different curvatures in the X direction and the Y direction.

An object of the present invention is to provide a correction lens capable of correcting a shift between a focal position of a first direction component and a focal position of a second direction component in an optical system in which a light-transmissive cover member having different curvatures in a first direction perpendicular to an optical axis and a second direction perpendicular to the optical axis and the first direction is disposed on an object side, and an imaging apparatus including the correction lens.

SUMMARY OF THE INVENTION

In order to solve the problems, a correction lens according to the present invention is used in an optical system in which a light-transmissive cover member having radii of curvature different from each other in a first direction perpendicular to an optical axis and a second direction perpendicular to the optical axis and the first direction is disposed on an object side. Radii of curvature of an image-side surface of the correction lens are different in the first direction and the second direction, and the following condition is satisfied:

$$0.0 \leq |R2S/R2L| < 1.0 \qquad (1)$$

where

R2S is a radius of curvature of the image-side surface of the correction lens in the first direction or the second direction and has a smaller absolute value, and R2L is a radius of curvature of the image-side surface of the correction lens in the first direction or the second direction and has a larger absolute value.

In order to solve the problems, a correction lens according to the present invention is used in an optical system in which a light-transmissive cover member having radii of curvature different from each other in a first direction perpendicular to an optical axis and a second direction perpendicular to the optical axis and the first direction is disposed on an object side and corrects a shift between focal positions caused in the first direction and the second direction by the light-transmissive cover member. Radii of curvature of an image-side surface of the correction lens are different in the first direction and the second direction, and each radius of curvature is set to a different value depending on the radius of curvature of the light-transmissive cover member in each direction.

In order to solve the problems, an imaging apparatus according to the present invention includes the correction lens, the optical system, and an image sensor that is disposed closer to an image side than the optical system, and on which an optical image formed by the optical system and the correction lens is incident.

According to the present invention, it is possible to provide the correction lens capable of correcting the shift between the focal position of the first direction component and the focal position of the second direction component in the optical system in which the light-transmissive cover member having the different curvatures in the first direction perpendicular to the optical axis and the second direction perpendicular to the optical axis and the first direction is disposed on the object side, and the imaging apparatus including the correction lens.

DESCRIPTION OF THE EMBODIMENTS

Figure 1:
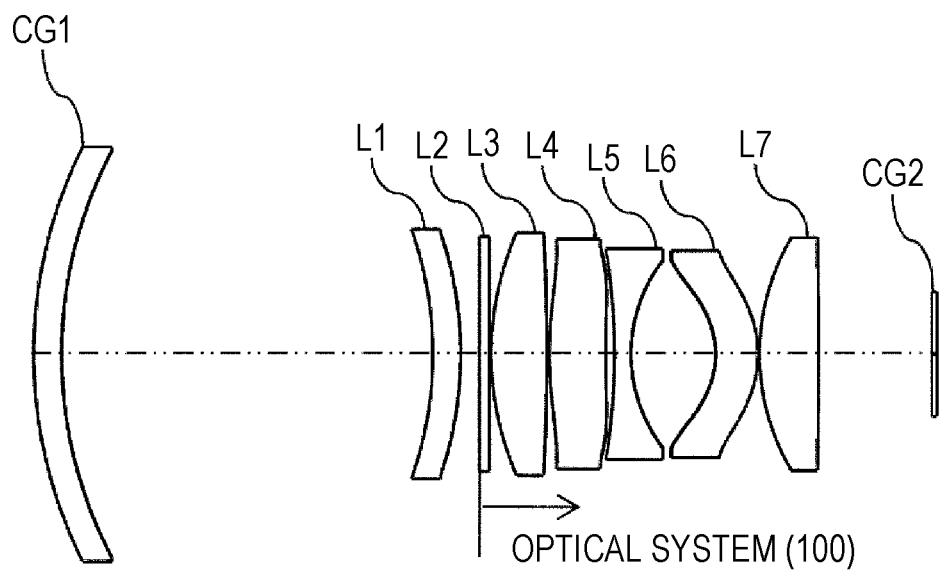
FIG. 1 is a lens cross-sectional view of an optical system including a correction lens of Example 1 of the present invention on an X-Z plane during infinity focus; in which a direction of an optical axis of the optical system is a Z direction, a first direction perpendicular to the optical axis is an X direction, and a second direction perpendicular to the optical axis and the first direction is a Y direction (hereinafter, the same is true of all drawings)

Hereinafter, embodiments of a correction lens and an imaging apparatus according to the present invention will be described. However, a correction lens and an imaging apparatus to be described below are aspects of the correction lens and the imaging apparatus according to the present invention, and the correction lens and the imaging apparatus according to the present invention are not limited to the following aspects.

1. Correction Lens

The correction lens according to the present invention is used in an optical system in which a predetermined light-transmissive cover member is disposed on an object side. Initially, the embodiment of the correction lens according to the present invention will be described after aspects of the light-transmissive cover member and the optical system in which the correction lens is used are described. Hereinafter, it is assumed that a direction of optical axes of the optical system and the correction lens is a Z direction, a first direction perpendicular to the optical axis is an X direction, and a direction perpendicular to the optical axis and the first direction is a Y direction.

1-1. Optical System

A configuration of the optical system in which the correction lens is used is not particularly limited. For example, an imaging optical system in which a plurality of lenses is combined can be used. Examples of the imaging optical system include various optical systems such as imaging optical systems of an in-vehicle imaging apparatus and a surveillance imaging apparatus (including a view camera, a sensing camera, and a TOF camera in both cases) and observation optical systems such as a microscope and an endoscope. In particular, various imaging optical systems to be used while being stored on the inside of a light-transmissive cover member having a shape to be described below are suitable.

1-2. Light-Transmissive Cover Member

The light-transmissive cover member is transparent in an use wavelength range of the optical system, and has curvatures (radii of curvature) different from each other in the X direction and the Y direction. Here, a case where the light-transmissive cover member has the curvatures different from each other in the X direction and the Y direction includes a case where the curvature in any one direction is "0". The light-transmissive cover member may have a barrel shape in which the light-transmissive cover member has the curvatures in the X direction and the Y direction and the curvatures in the X direction and the Y direction are different or may have a cylindrical shape in which the light-transmissive cover member has the curvature in the X direction or the Y direction and the light-transmissive cover member does not have curvature in the other direction.

In the present embodiment, the optical system is stored on the inside of the light-transmissive cover member. In this case, the optical system is stored on the inside of the light-transmissive cover member such that a light-transmission surface (wall surface) of the light-transmissive cover member and an incident surface of the optical system face each other and the light-transmission surface of the light-transmissive cover member and the optical axis of the optical system are perpendicular. In the present embodiment, it is assumed that a direction of a central axis of the light-transmissive cover member coincides with the Y direction and the optical system is stored so as to be rotatable around the central axis of the light-transmissive cover member. However, the present invention is not limited to the aspect.

The light-transmissive cover member may be made of any material as long as the light-transmissive cover member is transparent for rays of the use wavelength range of the optical system, that is, the light-transmissive cover member transmits the rays of the use wavelength range. However, since the light-transmissive cover member is easily processed into a desired shape, satisfies practically required strength, and is inexpensive, it is preferable that the light-transmissive cover member be made of a resin such as a polycarbonate resin or an acrylic resin.

1-3. Correction Lens

When the direction of the optical axis is the Z-direction, the correction lens has different values of curvatures (radii of curvature) of an image-side surface in the X direction and the Y direction perpendicular to the optical axis. That is, the correction lens is formed such that at least one surface is a cylindrical surface or a toroidal surface, and is disposed such that the image-side surface is a cylindrical surface or a toroidal surface.

Here, when light is directly incident on the optical system, it is assumed that incident light is formed as an image on an ideal image plane of the optical system unless aberrations are taken into consideration. That is, when the light is directly incident on the optical system, it is assumed that a focal position of an X direction component and a focal position of a Y direction component coincide with each other and the light is formed as the image on the ideal image plane unless aberrations are taken into consideration. In this case, when the light is incident on the optical system through the light-transmissive cover member having the different curvatures in the X direction and the Y direction, there is a shift between the focal position of the X direction component and the focal position of the Y direction component due to the curvatures of the light-transmissive cover member. The correction lens is a lens that corrects the shift between the focal positions in the X direction and the Y direction, and the radii of curvature of the image-side surface of the correction lens in the directions are set as different values according to the radii of curvature in the directions of the light-transmissive cover member.

At time of correcting the focal position of the X direction component and the focal position of the Y direction component by using the correction lens, when the shift between the focal positions of these both direction components is corrected, the corrected focal positions of these both direction components may be positioned on the ideal image plane or may be positioned so as to be closer to an image side or an object side than the ideal image plane. This is because, when the shift between the focal positions of these both direction components is corrected, even though the focal positions of these both direction components are not present on the ideal image plane, image data obtained by an image sensor is relatively easily corrected through image processing.

In this case, the correction is performed by a correction lens having a refractive power of a different sign in the same direction as that of the light-transmissive cover member or a correction lens having a refractive power of the same sign in the direction different from that of the light-transmissive cover member.

Here, a case where the correction lens has the refractive power of the different sign in the same direction as that of the light-transmissive cover member means that the correction lens has a refractive power in a direction in which a refractive power of the light-transmissive cover member is offset, and means that the refractive power of the light-transmissive cover member and the refractive power of the correction lens have different signs in the direction of the X direction and the Y direction in which the light-transmissive cover member has the refractive power. Specifically, when the light-transmissive cover member has a negative refractive power in the X direction, the correction lens has a positive refractive power in the X direction. Similarly, when the light-transmissive cover member has a negative refractive power in the Y direction, the correction lens has a positive refractive power in the Y direction. Even when the light-transmissive cover member has refractive powers of reverse signs in the X direction and the Y direction, the correction lens has the refractive power in a direction in which the refractive power of the light-transmissive cover member is offset as above.

When the correction lens has the refractive power of the different sign in the same direction as that of the light-transmissive cover member, since the refractive power of the light-transmissive cover member is offset by the refractive power of the correction lens, the shift between the focal position of the X direction component and the focal position of the Y direction component is corrected, and the correction is performed such that the focal positions of these both direction components are positioned on the ideal image plane. When the light-transmissive cover member has the refractive power in only any one direction of the X direction and the Y direction, it is sufficient for the correction lens to have the refractive power of the sign (the negative sign in the case of the positive sign or the positive sign in the case of the negative sign) different from that of the light-transmissive cover member in this direction. In this case, it is preferable that the correction lens do not have a substantial refractive power in the direction in which the light-transmissive cover member does not have a substantial refractive power.

It is possible to suppress a decline in optical performance out of the axis by adopting the correction lens having the refractive power of the different sign in the same direction as that of the light-transmissive cover member. That is, an off-axial aberration caused by the light-transmissive cover member is offset by the correction lens, and thus, the optical performance of the optical system can be maintained in a favorable state. Thus, it is preferable that the correction lens have the refractive power of the different sign in the same direction as that of the light-transmissive cover member.

Meanwhile, a case where the correction lens has the refractive power of the same sign in the direction different from that of the light-transmissive cover member means that the correction lens has a refractive power in a direction in which the refractive power of the light-transmissive cover member is complemented, and means that the correction lens has a refractive power of the same sign as that of the light-transmissive cover member in the other direction when the light-transmissive cover member has a refractive power in any one direction of the X direction and the Y direction. Specifically, when the light-transmissive cover member has a negative refractive power in the X direction, the correction lens has a negative refractive power in the Y direction. Similarly, when the light-transmissive cover member has a negative refractive power in the Y direction, the correction lens has a negative refractive power in the X direction. A case where the light-transmissive cover member has refractive powers of reverse signs in the X direction and the Y direction means that the correction lens has the refractive power in the direction in which the refractive power of the light-transmissive cover member is complemented as above. When the light-transmissive cover member has the refractive power in only any one of the X direction and the Y direction, it is sufficient for the correction lens to have the refractive power of the same sign (the positive sign in the case of the positive sign or the negative sign in the case of the negative sign) as that of the light-transmissive cover member in the other direction. In this case, when the light-transmissive cover member does not have a substantial refractive power in the other direction, it is preferable that the correction lens do not have a substantial refractive power in one direction.

When the correction lens has the refractive power of the same sign in the direction different from that of the light-transmissive cover member, since the refractive power of the light-transmissive cover member is complemented by the refractive power of the correction lens, the correction is performed such that the focal position of the other direction component is positioned at the focal position of any one direction component of the X direction component and the Y direction component, or the focal positions of these both direction components are corrected such that the focal position of the other direction component is positioned at any position between the focal positions of these both direction components. In this case, even though the corrected focal positions of these both direction components are not positioned in the ideal image plane, when the focal positions of these both direction components coincide with each other, the image data obtained by the image sensor is relatively easily corrected through the image processing as stated above.

When the light-transmissive cover member has the refractive power in only any one direction of the X direction and the Y direction, it is more preferable that the correction lens have the refractive power of the sign different from that of the light-transmissive cover member in the same direction as the direction in which the light-transmissive cover member has the refractive power. When the light-transmissive cover member has the refractive power in only any one direction of the X direction and the Y direction and the correction lens having the refractive power of the same sign as that of the light-transmissive cover member in the direction different from the direction in which the light-transmissive cover member has the refractive power is used, it is difficult to remove an aberration of off-axis light caused in the light-transmissive cover member. Thus, in order to obtain more favorable optical performance, when the light-transmissive cover member has the refractive power in only any one direction, it is preferable that the aberration of the off-axis light caused in the light-transmissive cover member be offset by using the correction lens having the refractive power of the different sign in the same direction as the direction in which the light-transmissive cover member has the refractive power.

When the light-transmissive cover member has the negative refractive power in any one direction of the X direction and the Y direction and does not have the substantial refractive power in the other direction, it is more preferable that the correction lens have the positive refractive power in the same direction as the direction in which the light-transmissive cover member has the refractive power. When the light-transmissive cover member has the negative refractive power in any one direction and does not have the substantial refractive power in the other direction, an imaging position moves to the image side (in an opposite direction to a subject side) from the ideal image plane. In this case, when the correction lens having the negative refractive power in the direction different from the direction in which the light-transmissive cover member has the negative refractive power is used, the entire optical length may be long. Accordingly, in this case, when the correction lens having the positive refractive power in same direction as the direction in which the light-transmissive cover member has the refractive power is adopted, since the imaging position is corrected onto the ideal image plane, it is possible to achieve a compact optical system as a whole without an increase in entire optical length. Thus, it is more preferable to adopt such a correction lens.

It is preferable that the correction lens be made of the same material as that of the light-transmissive cover member. Even though there is the shift between the focal positions due to the light-transmissive cover member as an atmosphere temperature is changed, when the correction lens is made of the same material as that of the light-transmissive cover member, since this shift can be corrected, it is preferable to such a correction lens.

It is preferable that the correction lens have a curvature even on any surface of an object-side surface and an image-side surface in the direction in which the correction lens has the refractive power. In this case, it is preferable that the object-side surface and the image-side surface have the radii of curvature of the same sign. When the object-side surface is a flat surface in the same direction and the correction lens has the curvature on the image-side surface, since it is necessary to extremely loose the curvature of the image-side surface in order to obtain a refractive power required for correction, it is difficult to manufacture the correction lens. Thus, it is not preferable that the object-side surface be the flat surface. Since the shift between the focal positions caused in the light-transmissive cover member is extremely small, the object-side surface and the image-side surface have the curvatures, and thus, it is possible to finely adjust a correction amount while securing manufacturability. Accordingly, it is possible to obtain a more favorable image.

1-4. Conditional Inequality

It is preferable that the correction lens adopt the aforementioned configuration and satisfy one or more Conditional Inequalities to be described below.

1-4-1. Conditional Inequality (1)

$$0.0 \leq |R2S/R2L| < 1.0 \tag{1}$$

where

R2S is the radius of curvature of the imaging-side surface of the correction lens in the first direction (X direction) or the second direction (Y direction) and has a smaller absolute value, and R2L is the radius of curvature of the image-side surface of the correction lens in the first direction (X direction) or the second direction (Y direction) and has a larger absolute value.

Conditional Inequality (1) is an Inequality in which a ratio of the curvature (radius of curvature) of the image-side surface of the correction lens in the X direction and the curvature (radius of curvature) thereof in the Y direction is defined. Conditional Inequality (1) is satisfied, and thus, it is possible to correct the shift between the focal position of the X direction component and the focal position of the Y direction component by using the correction lens even though there is the shift between the focal position of the X direction component of the incident light and the focal position of the Y direction component thereof when the light is incident on the optical system through the light-transmissive cover member.

When the value of Conditional Inequality (1) is equal to or greater than an upper limit, it is difficult to correct the shift between the focal position of the X direction component and the focal position of the Y direction component when the light is incident on the optical system through the light-transmissive cover member having different curvatures in the X direction and the Y direction. Even though the focal position of the X direction component and the focal position of the Y direction component in the light incident on the optical system are shifted from the ideal image plane, when the focal position of the X direction component and the focal position of the Y direction component coincide with each other, the image data obtained by the image sensor disposed on the ideal image plane can be corrected by the image processing, or an image-plane position of the image sensor can be adjusted. However, for example, when the focal position of the X direction component and the focal position of the Y direction component do not coincide with each other, it is difficult to correct the image data obtained by the image sensor by the image processing. Thus, for example, in the case of the TOF camera, since it is difficult to detect a direction of an object or a distance from the object present in the surroundings with high accuracy based on the obtained image data, it is not preferable to use the TOF camera.

In order to acquire these effects, a lower limit of Conditional Inequality (1) is more preferably 0.2, and still more preferably, 0.3. The upper limit of Conditional Inequality (1) is more preferably 0.9, still more preferably 0.8, still more preferably 0.76, and still more preferably 0.72. The lower limit of Conditional Inequality (1) is preferably 0, more preferably 0.1, and most preferably 0.01. In this case, it is preferable that an inequality sign (≤) with an equality sign be replaced with an inequality sign (<) or the inequality sign (<) be replaced with the inequality sign (≤) with the equality sign in Conditional Inequality (1). The same is true of Conditional Inequalities to be described below. Unless the context clearly indicates otherwise, both the values of the lower limit and the upper limit may be preferable values, or only one thereof may be a preferable value.

1-4-2. Conditional Inequality (2)

$$0 \le (|RAx| - |RBx|)/(|RAx| + |RBx|) < 0.27 \quad (2)$$

where

RAx is the radius of curvature of the object-side surface or the image-side surface of the correction lens in the first direction (X direction) and has a larger absolute value, and RBx is the radius of curvature of the object-side surface or the image-side surface of the correction lens in the first direction (X direction) and has a smaller absolute value.

Conditional Inequality (2) is an Inequality in which the radius of curvature of the correction lens in the X direction is defined. Conditional Inequality (2) is satisfied, and thus, it is possible to form a surface shape appropriate to correct the shift between the focal position of the X direction component and the focal position of the Y direction component in the light incident on the optical system through the light-transmissive cover member by using the correction lens for the optical system including the light-transmissive cover member having the curvatures different from each other in the X direction and the Y direction on the object-side surface.

In order to acquire the effects, a lower limit of Conditional Inequality (2) is more preferably 0.0016, still more preferably 0.0156, and still more preferably 0.0242. An upper limit of Conditional Inequality (2) is more preferably 0.2647, still more preferably 0.2380, still more preferably 0.1500, still more preferably 0.0948, and still more preferably 0.0909.

1-4-3. Conditional Inequality (3)

$$0 \le (|RAy| - |RBy|)/(|RAy| + |RBy|) < 0.27 \quad (3)$$

where

RAy is the radius of curvature of the object-side surface or the image-side surface of the correction lens in the second direction (Y direction) and has a larger absolute value, and RBy is the radius of curvature of the object-side surface or the image-side surface of the correction lens in the second direction (Y direction) and has a smaller absolute value.

Conditional Inequality (3) is an Inequality in which the radius of curvature of the correction lens in the Y direction is defined. Conditional Inequality (3) is satisfied, and thus, it is possible to form a surface shape appropriate to correct the shift between the focal position of the X direction component and the focal position of the Y direction component in the light incident on the optical system through the light-transmissive cover member by using the correction lens for the optical system including the light-transmissive cover member having the curvatures different from each other in the X direction and the Y direction on the object-side surface.

2. Imaging Apparatus

Next, the imaging apparatus according to the present invention will be described. The imaging apparatus according to the present invention includes the correction lens according to the present invention, an optical system, and an image sensor which is disposed closer to the image side than the optical system and on which an optical image formed by the optical system and the correction lens is incident.

Here, the optical system and the image sensor are not particularly limited. The optical system is as described above. Solid-state image sensors such as a charge coupled device (CCD) sensor and a complementary metal oxide semiconductor (CMOS) sensor can be used as the image sensor. The imaging apparatus according to the present invention may be a lens-fixed imaging apparatus of which a lens is fixed to a housing, or may be a lens-interchangeable imaging apparatus such as a single lens reflex camera or a mirrorless camera. In particular, an imaging apparatus in which the light-transmissive cover member which has the cylindrical shape or the barrel shape and has the different curvatures in the X direction and the Y direction is provided on the object side of the optical system is suitable as the imaging apparatus according to the present invention. For example, an installation-type imaging apparatus installed on a mobile object such as a vehicle or a building, such as an in-vehicle imaging apparatus or a surveillance imaging apparatus used for the purpose of sensing or monitoring is suitable. Here, examples of the mobile object include various mobile objects such as a land mobile object such as a vehicle, an aerial mobile object such as an airplane, and a marine mobile object such as a ship. A sensing camera (including the TOF camera) used for detecting ahead of each mobile object in a moving direction or an object in the surroundings, detecting a position and a direction, or recognizing what is the object is suitable. It is assumed that the mobile object includes various mobile objects such as an unmanned aerial vehicle (drone), an unmanned explorer, and a robot (including a robot cleaner) having an independent moving function such as an independent bipedal walking robot.

Next, the present invention will be described in detail in conjunction with examples. However, the present invention is not limited to the following examples.

Example 1

(1) Optical Configuration of Optical System

Figure 2:
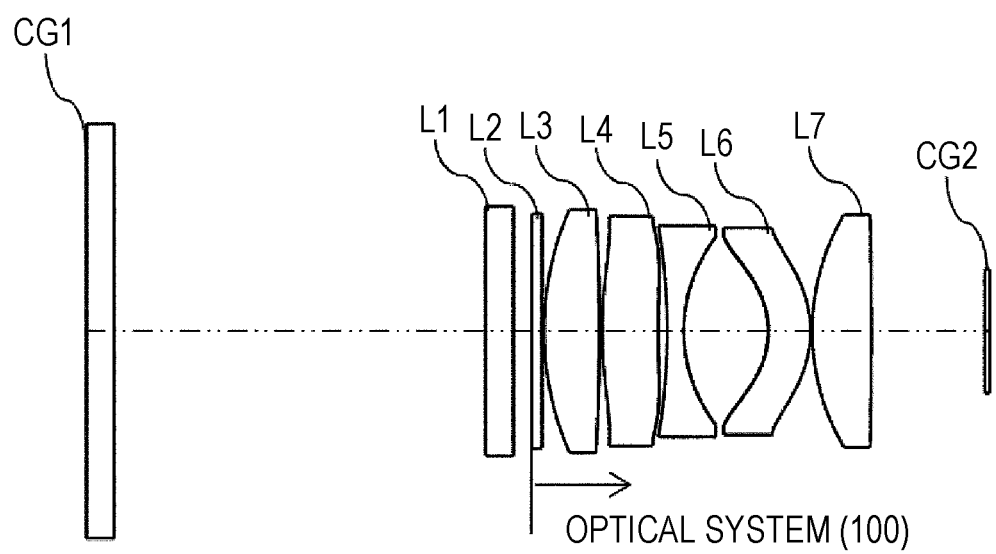
FIG. 2 is a lens cross-sectional view of the optical system including the correction lens of Example 1 on a Y-Z plane during infinite focus.

FIGS. 1 and 2 are lens cross-sectional views of an optical system including a correction lens of Example 1 on the X-Z plane and the Y-Z plane during infinity focus. "CG1" shown in FIGS. 1 and 2 is the light-transmissive cover member.

"CG2" is a parallel plate not having a substantial refractive power such as a cover glass provided on the object side of the image plane of the solid-state image sensor. Since the same is true of lens cross-sectional views shown in other examples, the description thereof will be omitted.

A correction lens L1 of Example 1 is disposed on the inside (image side) of the light-transmissive cover member CG1 and is on the object side of the optical system. The optical system includes, in order form the object side, a lens L2, a biconvex lens L3, a positive meniscus lens L4 having a shape convex toward the object side, a biconcave lens L5, a positive meniscus lens L6 having a shape convex toward the image side, and a biconvex lens L7.

Figure 44:
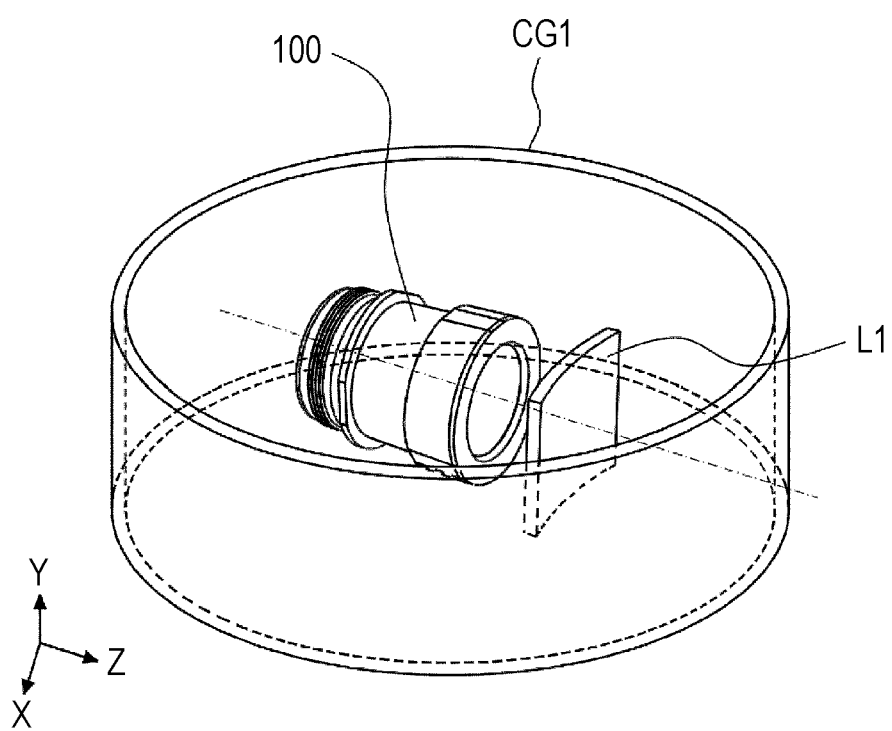
FIG. 44 is a perspective view showing a configuration example of the correction lens, the light-transmissive cover member, and the optical system according to the present invention.

As shown in FIG. 44, the optical system 100 is stored on the inside of the light-transmissive cover member CG1 such that the optical axis of the optical system 100 is perpendicular to the light-transmission surface (wall surface) of the light-transmissive cover member CG1 having the cylindrical shape. The light-transmission surface of the light-transmissive cover member CG1 has the curvature in the X direction and does not have the curvature in the Y direction. The central axis of the light-transmissive cover member CG1 extends in the Y direction, and the optical system 100 is stored so as to be rotatable around the central axis thereof. It is assumed in the example shown in FIG. 44 that the X direction is substantially a horizontal direction and the Y direction is substantially a vertical direction. However, in the present invention, the first direction and the second direction may be respectively directions perpendicular to the optical axis, and the first direction and the second direction may be perpendicular to each other. These directions are not limited to the aspect shown in FIG. 44.

(2) Numerical Example

Next, a numerical example to which specific numerical values are applied will be described. Surface data of the light-transmissive cover member CG1 and the correction lens L1 of Example 1 are represented in Table 1. In Table 1, "Surface number" indicates the order of a lens surface counted from the object side, "Type" indicates a surface shape, "RX" indicates a radius of curvature of the lens surface in the X direction (first direction), "RY" indicates a radius of curvature of the lens surface in the Y direction (second direction), "D" indicates a lens thickness or a lens interval on the optical axis, and "N" indicates a refractive power at a d line (wavelength λ=587.56 nm). "CYLINDRICAL" represented in a column of "Type" means that the lens surface is a cylindrical surface. In tables to be described below, "TOROIDAL" means that the lens surface is a toroidal surface. However, in the case of the surface represented by "TOROIDAL", there is a case where this surface does not have the substantial refractive power. "INF" represented in a column of "RY" means that the lens surface is a flat surface. All units of lengths in the table are "mm".

In Table 2, surface data of the lenses constituting the optical system of Example 1 are represented. In Table 2, "Surface number" indicates the order of a lens surface counted from the object side, "Type" indicates a surface shape, "R" indicates a radius of curvature of the lens surface, "D" indicates a lens thickness or a lens interval on the optical axis, and "N" indicates a refractive power at a d line (wavelength λ=587.56 nm). "SPH" represented in a column of "Type" indicates that the lens surface is a spherical surface, and "ASP" indicates that the lens surface is an aspheric surface. "STO" means an aperture stop. "INF" represented in a column of "R" means that the lens surface is a flat surface and indicates a paraxial radius of curvature when the lens surface is the aspheric surface. All units of lengths in the table are "mm".

Table 3 represents aspheric coefficients of aspheric surfaces. The aspheric coefficient is a value when each aspheric surface shape is defined by the following equation.

$$z = ch^2/[1+\{1-(1+k)c^2h^2\}^{1/2}] + A4h^4 + A6h^6 + A8h^8 + A10h^{10}$$

However, in the above equation, "c" indicates a curvature (1/r), "h" indicates a height from the optical axis, "k" is a conic constant, "A4", "A6", "A8", "A10" indicate aspheric coefficients of orders. In Table 2, "E-n" indicates "×10⁻ⁿ".

In Table 28, values of Conditional Inequality (1) to Conditional Inequality (3) are represented.

The matters related to the aforementioned tables are similarly applied to tables to be represented in other examples.

TABLE 1

| Surface number | Type | RX | RY | D | N |
|---|---|---|---|---|---|
| 1 | CYLINDRICAL | 50.000 | INF | 3.000 | 1.58547 |
| 2 | CYLINDRICAL | 47.000 | INF | 40.000 | |
| 3 | CYLINDRICAL | −40.150 | INF | 3.000 | 1.58547 |
| 4 | CYLINDRICAL | −40.000 | INF | 2.000 | |

TABLE 2

| Surface number | Type | R | D | N |
|---|---|---|---|---|
| 5 | SPH | INF | 1.100 | 1.51633 |
| 6 | STO | INF | 0.200 | |
| 7 | SPH | 32.740 | 6.000 | 2.00100 |
| 8 | SPH | −234.000 | 0.280 | |
| 9 | ASP | 41.995 | 6.010 | 1.66134 |
| 10 | ASP | 76.460 | 1.000 | |
| 11 | SPH | −69.800 | 1.770 | 1.51633 |
| 12 | SPH | 16.550 | 9.118 | |
| 13 | ASP | −9.505 | 4.550 | 1.66134 |
| 14 | ASP | −12.115 | 0.200 | |
| 15 | SPH | 24.800 | 6.300 | 2.00100 |
| 16 | SPH | −800.000 | 12.207 | |
| 17 | SPH | INF | 0.500 | 1.51633 |

TABLE 3

| Surface number | k | A4 | A6 | A8 | A10 | A12 |
|---|---|---|---|---|---|---|
| 9 | 8.5742 | −4.9696E−05 | −1.5222E−07 | 2.0419E−10 | −2.8640E−12 | 1.3119E−15 |
| 10 | 34.1227 | −9.5575E−05 | −1.5792E−07 | 1.5704E−09 | −7.3151E−12 | 2.7879E−14 |
| 13 | −0.9538 | −7.0871E−05 | 1.8601E−07 | 1.1869E−08 | 4.1195E−11 | −4.5814E−13 |
| 14 | −0.1231 | 4.0736E−05 | 4.5702E−07 | 2.2723E−09 | 2.0906E−11 | −9.0618E−15 |

Figure 3:
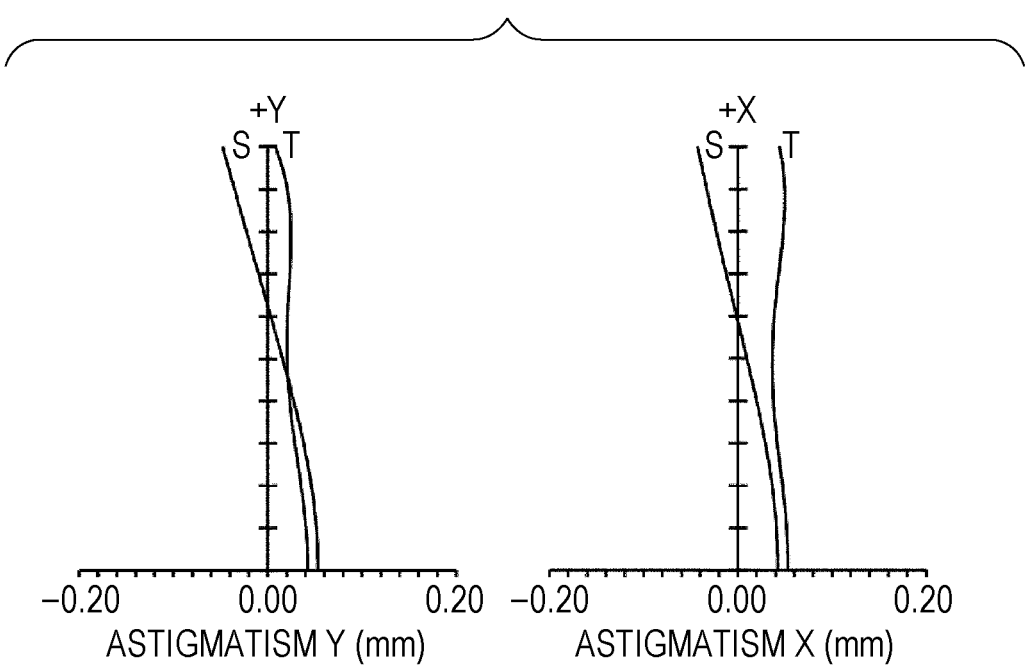
FIG. 3 shows astigmatism charts of the optical system including the correction lens of Example 1 during infinity focus.

FIG. 3 shows astigmatism charts of the optical system including the correction lens L1 and the light-transmissive cover member CG1 of Example 1 during infinity focus. In FIG. 3, a left side is an astigmatism Y in the Y direction, and a right side is an astigmatism X in the X direction. In each chart, a vertical axis represents a half angle of view, S represented in each chart indicates a sagittal plane, and T indicates characteristics in a reference wavelength (905 nm) of the optical system on a tangental plane.

Figure 4:
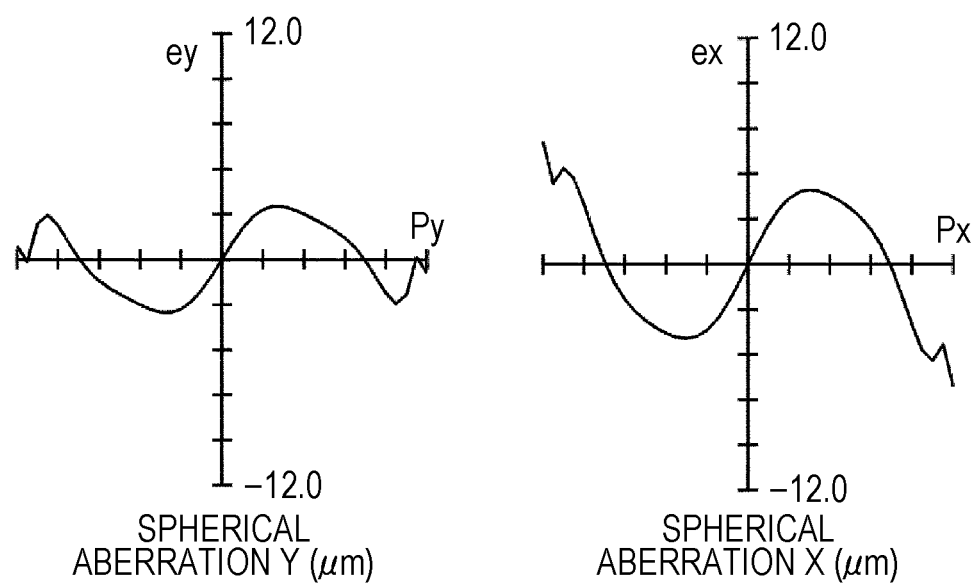
FIG. 4 shows spherical aberration charts of the optical system including the correction lens of Example 1 during infinity focus.

FIG. 4 shows lateral aberration charts showing spherical aberrations of the optical system including the correction lens L1 and the light-transmissive cover member CG1 of Example 1 during infinity focus. In FIG. 4, a left side is a spherical aberration Y in the Y direction, and a right side is a spherical aberration X in the X direction. In each chart, a vertical axis represents a lateral aberration amount, and a horizontal axis represents a pupil diameter ratio and shows characteristics in a reference wavelength (905 nm) of the optical system.

The matters related to these lateral aberration charts are similarly applied to lateral aberration charts to be represented in other examples.

Example 2

(1) Optical Configuration of Optical System

Figure 5A:
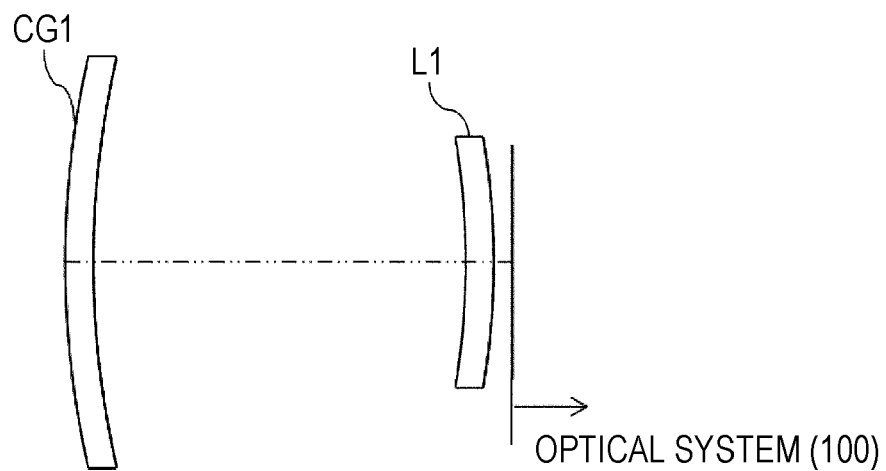
FIG. 5A is a lens cross-sectional view of an optical system including a correction lens of Example 2 of the present invention on the X-Z plane during infinity focus.
Figure 5B:
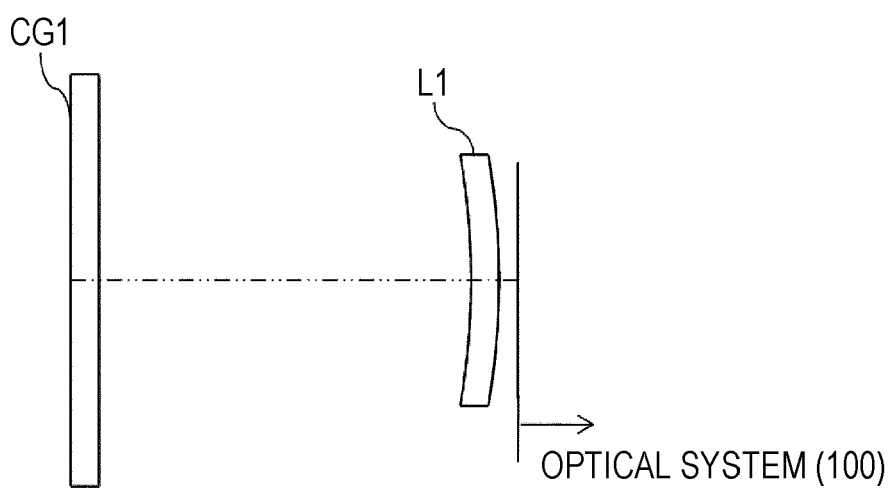
FIG. 5B is a lens cross-sectional view of an optical system including a correction lens of Example 2 of the present invention on the Y-Z plane during infinity focus.

FIG. 5A is a lens cross-sectional view of an optical system including a correction lens of Example 2 of the present invention on the X-Z plane during infinity focus, and FIG. 5B is a lens cross-sectional view of an optical system including a correction lens of Example 2 of the present invention on the Y-Z plane during infinity focus. The correction lens L1 of Example 2 is disposed on the inside (image side) of the light-transmissive cover member CG1 and is on the object side of the optical system. The optical system of Example 2 is the same as the optical system of Example 1, and is stored on the inside of the light-transmissive cover member CG1 as in Example 1.

(2) Numerical Example

Figure 6:
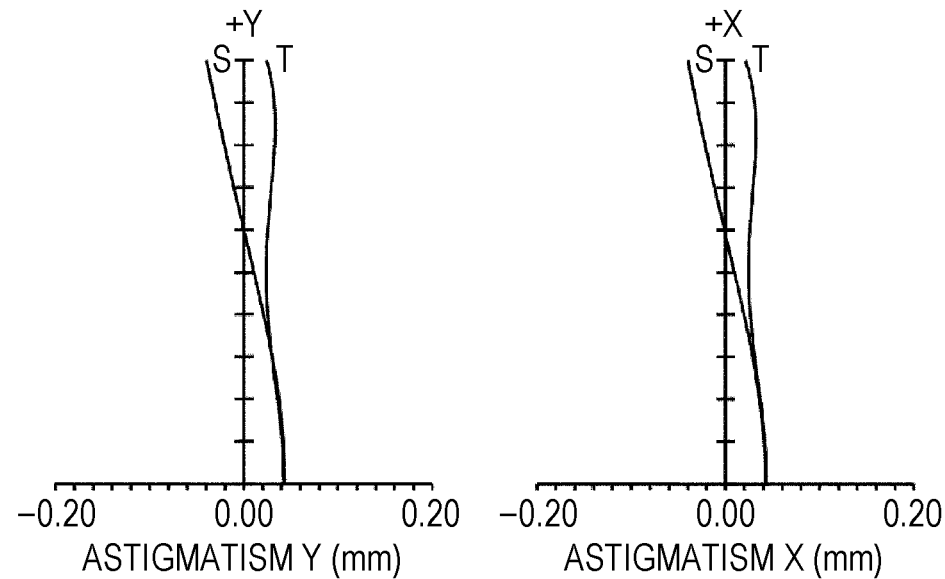
FIG. 6 shows astigmatism charts of the optical system including the correction lens of Example 2 during infinity focus.
Figure 7:
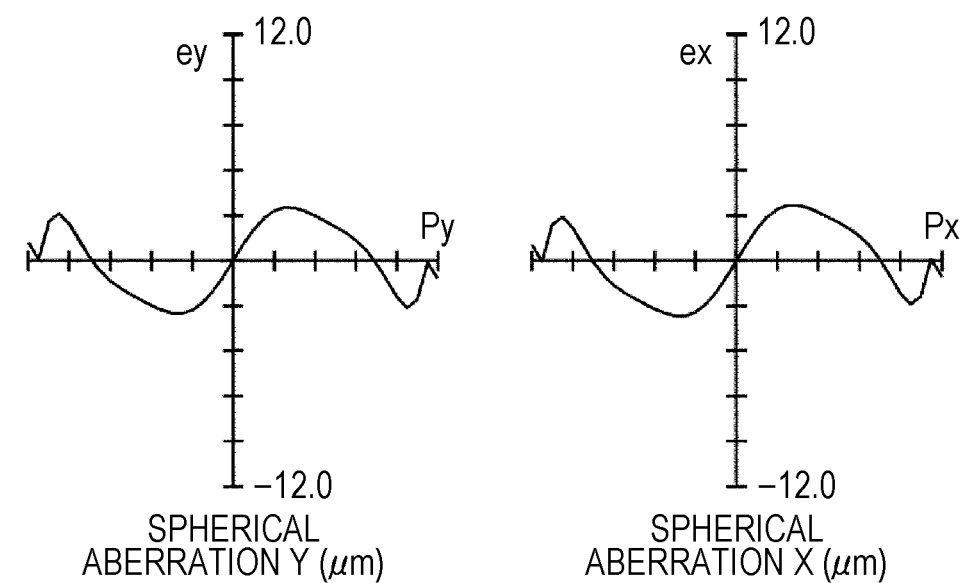
FIG. 7 show spherical aberration charts of the optical system including the correction lens of Example 2 during infinity focus.

Next, a numerical example to which specific numerical values are applied will be described. Surface data of the light-transmissive cover member CG1 and the correction lens L1 of Example 2 are represented in Table 4. Surface data and aspheric coefficients of the optical system are the same as data represented in Tables 2 and 3 of Example 1. In Table 28, values of Conditional Inequality (1) to Conditional Inequality (3) are represented. FIGS. 6 and 7 show astigmatism charts and spherical aberration charts of the optical system including the correction lens L1 and the light-transmissive cover member CG1 of Example 2 during infinity focus.

TABLE 4

| Surface number | Type | RX | RY | D | N |
|---|---|---|---|---|---|
| 1 | CYLINDRICAL | 100.000 | INF | 3.000 | 1.58547 |
| 2 | CYLINDRICAL | 97.000 | INF | 40.000 | |
| 3 | TOROIDAL | −80.150 | −78.910 | 3.000 | 1.58547 |
| 4 | TOROIDAL | −80.000 | −79.999 | 2.000 | |

Example 3

(1) Optical Configuration of Optical System

Figure 8A:
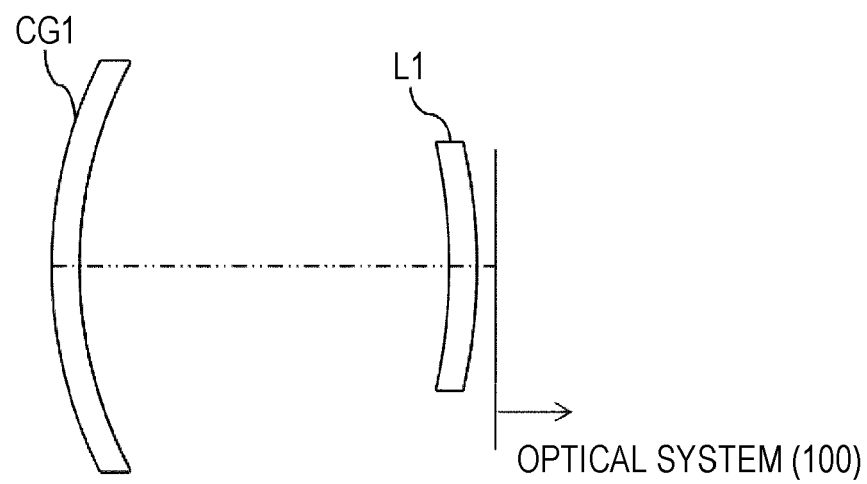
FIG. 8A is a lens cross-sectional view of an optical system including a correction lens of Example 3 of the present invention on the X-Z plane during infinity focus.
Figure 8B:
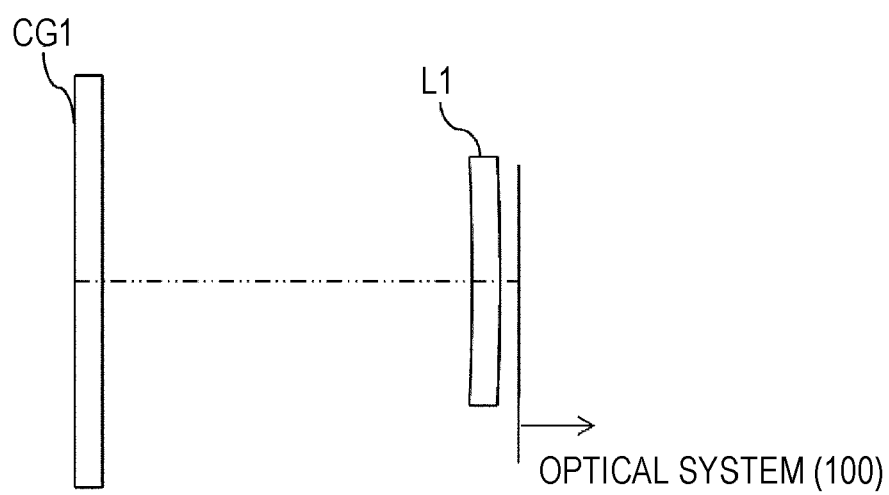
FIG. 8B is a lens cross-sectional view of an optical system including a correction lens of Example 3 of the present invention on the Y-Z plane during infinity focus.

FIG. 8A is a lens cross-sectional view of an optical system including a correction lens of Example 3 of the present invention on the X-Z plane during infinity focus, and FIG. 8B is a lens cross-sectional view of an optical system including a correction lens of Example 3 of the present invention on the Y-Z plane during infinity focus. The correction lens L1 of Example 3 is disposed on the inside (image side) of the light-transmissive cover member CG1 and is on the object side of the optical system. The optical system of Example 3 is the same as the optical system of Example 1, and is stored on the inside of the light-transmissive cover member CG1 as in Example 1.

(2) Numerical Example

Figure 9:
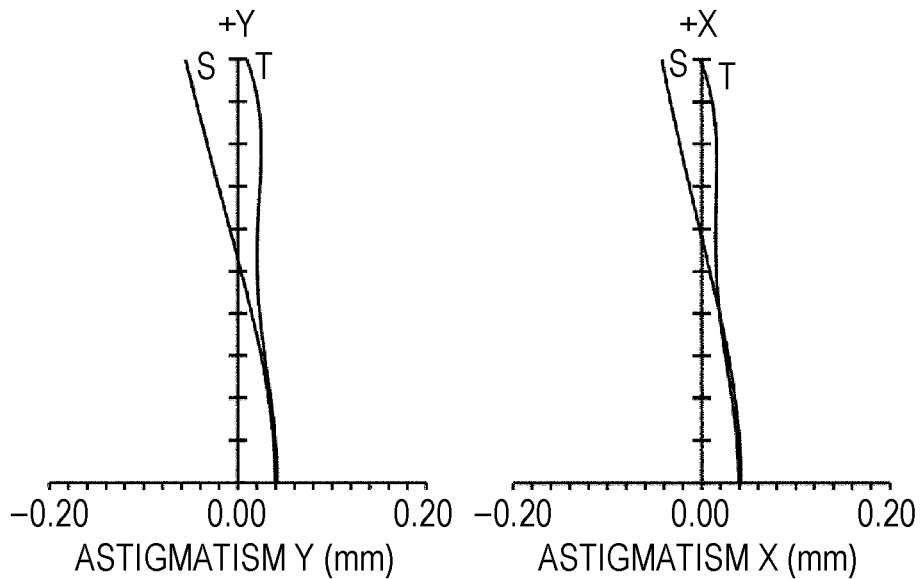
FIG. 9 shows astigmatism charts of the optical system including the correction lens of Example 3 during infinity focus.
Figure 10:
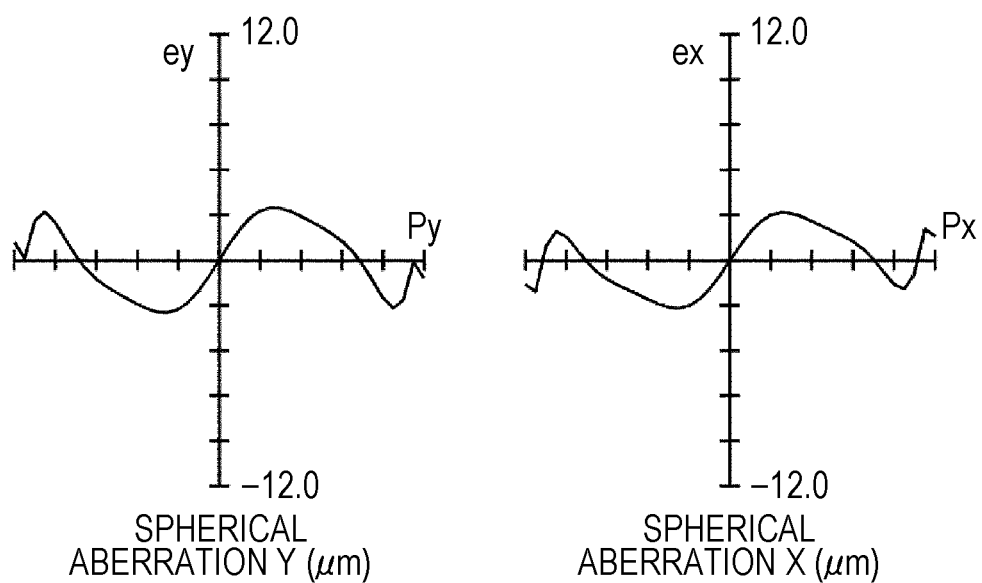
FIG. 10 show spherical aberration charts of the optical system including the correction lens of Example 3 during infinity focus.

Next, a numerical example to which specific numerical values are applied will be described. Surface data of the light-transmissive cover member CG1 and the correction lens L1 of Example 3 are represented in Table 5. Surface data and aspheric coefficients of the optical system are the same as data represented in Tables 2 and 3 of Example 1. In Table 28, values of Conditional Inequality (1) to Conditional Inequality (3) are represented. FIGS. 9 and 10 show astigmatism charts and spherical aberration charts of the optical system including the correction lens L1 and the light-transmissive cover member CG1 of Example 3 during infinity focus.

TABLE 5

| Surface number | Type | RX | RY | D | N |
|---|---|---|---|---|---|
| 1 | CYLINDRICAL | 50.000 | INF | 3.000 | 1.58547 |
| 2 | CYLINDRICAL | 47.000 | INF | 40.000 | |
| 3 | TOROIDAL | −61.910 | −299.000 | 3.000 | 1.58547 |
| 4 | TOROIDAL | −60.000 | −300.000 | 2.000 | |

Example 4

(1) Optical Configuration of Optical System

Figure 11A:
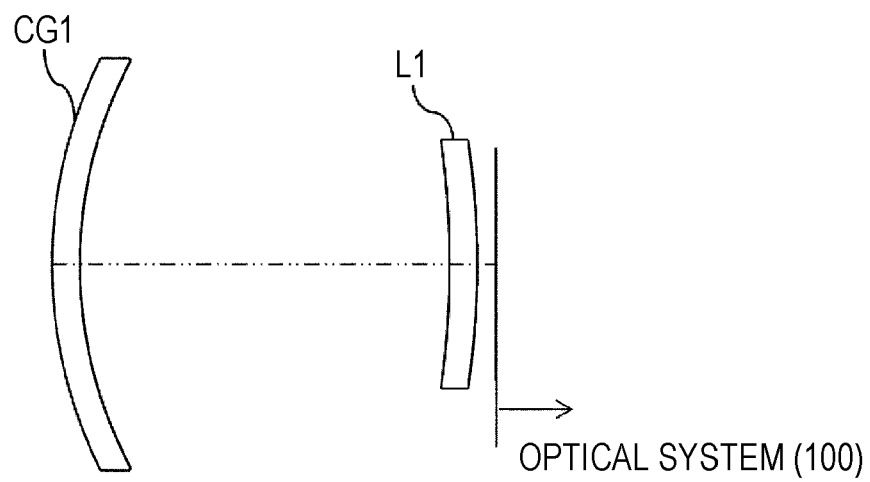
FIG. 11A is a lens cross-sectional view of an optical system including a correction lens of Example 4 of the present invention on the X-Z plane during infinity focus.
Figure 11B:
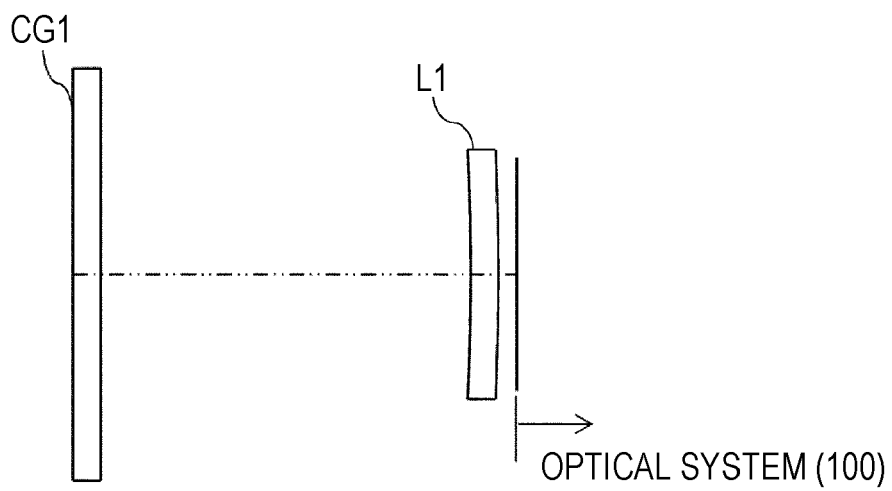
FIG. 11B is a lens cross-sectional view of an optical system including a correction lens of Example 4 of the present invention on the Y-Z plane during infinity focus.

FIG. 11A is a lens cross-sectional view of an optical system including a correction lens of Example 4 of the present invention on the X-Z plane during infinity focus, and FIG. 11B is a lens cross-sectional view of an optical system including a correction lens of Example 4 of the present invention on the Y-Z plane during infinity focus. The correction lens L1 of Example 4 is disposed on the inside (image side) of the light-transmissive cover member CG1 and is on the object side of the optical system. The optical system of Example 4 is the same as the optical system of Example 1, and is stored on the inside of the light-transmissive cover member CG1 as in Example 1.

(2) Numerical Example

Figure 12:
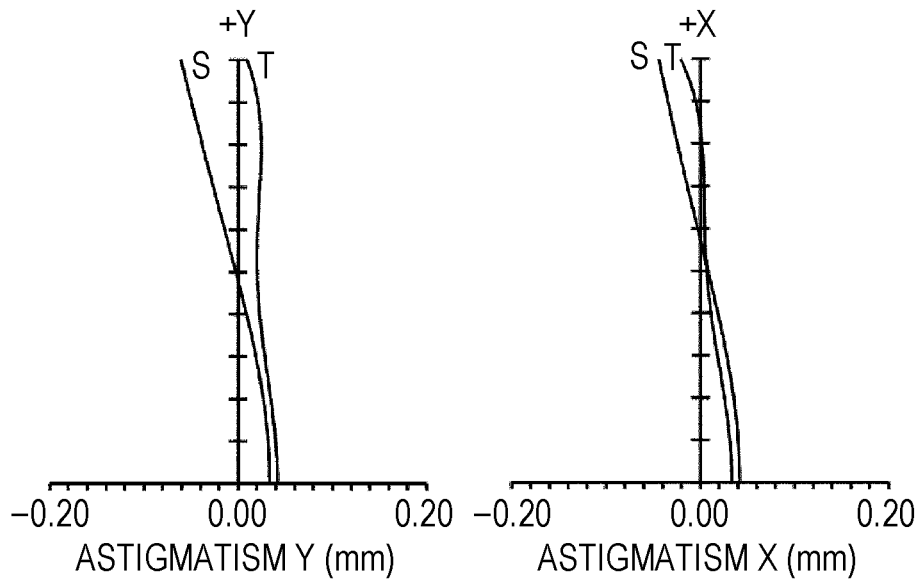
FIG. 12 shows astigmatism charts of the optical system including the correction lens of Example 4 during infinity focus.
Figure 13:
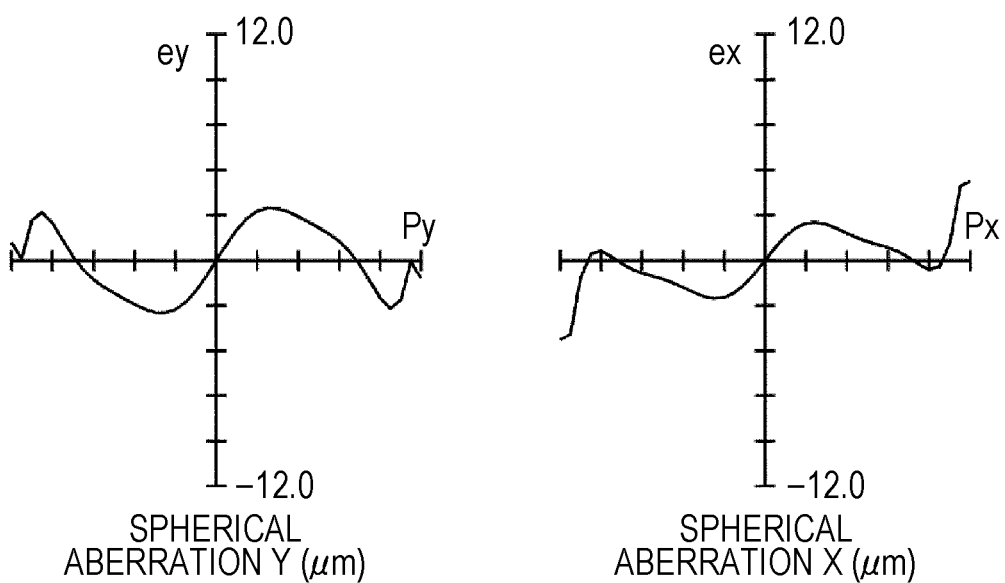
FIG. 13 show spherical aberration charts of the optical system including the correction lens of Example 4 during infinity focus.

Next, a numerical example to which specific numerical values are applied will be described. Surface data of the light-transmissive cover member CG1 and the correction lens L1 of Example 4 are represented in Table 6. Surface data and aspheric coefficients of the optical system are the same as data represented in Tables 2 and 3 of Example 1. In Table 28, values of Conditional Inequality (1) to Conditional Inequality (3) are represented. FIGS. 12 and 13 show astigmatism charts and spherical aberration charts of the optical system including the correction lens L1 and the light-transmissive cover member CG1 of Example 4 during infinity focus.

TABLE 6

| Surface number | Type | RX | RY | D | N |
|---|---|---|---|---|---|
| 1 | CYLINDRICAL | 50.000 | INF | 3.000 | 1.58547 |
| 2 | CYLINDRICAL | 47.000 | INF | 40.000 | |
| 3 | TOROIDAL | −96.030 | −299.000 | 3.000 | 1.58547 |
| 4 | TOROIDAL | −90.000 | −300.000 | 2.000 | |

Example 5

(1) Optical Configuration of Optical System

Figure 14A:
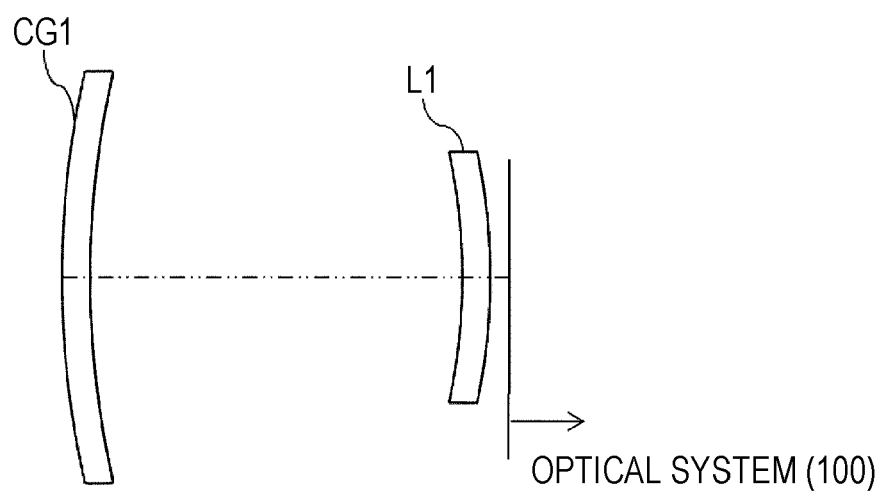
FIG. 14A is a lens cross-sectional view of an optical system including a correction lens of Example 5 of the present invention on the X-Z plane during infinity focus.
Figure 14B:
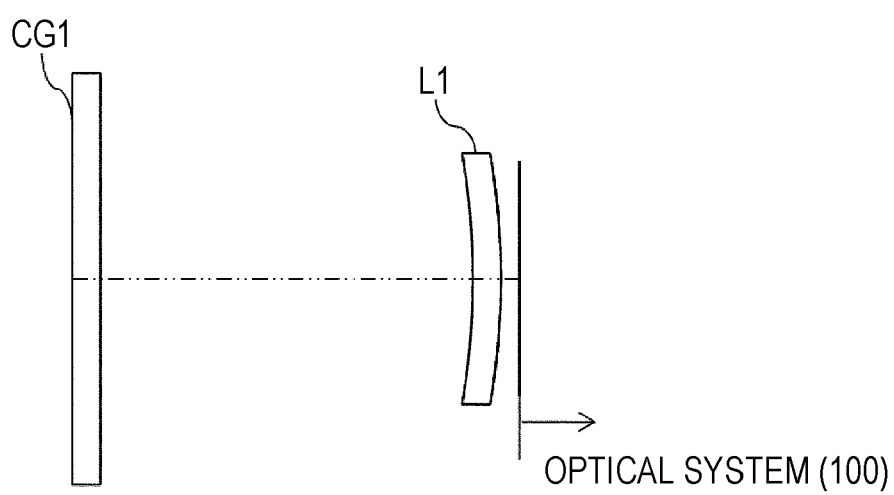
FIG. 14B is a lens cross-sectional view of an optical system including a correction lens of Example 5 of the present invention on and the Y-Z plane during infinity focus.

FIG. 14A is a lens cross-sectional view of an optical system including a correction lens of Example 5 of the present invention on the X-Z plane during infinity focus, and FIG. 14B is a lens cross-sectional view of an optical system including a correction lens of Example 5 of the present invention on and the Y-Z plane during infinity focus. The correction lens L1 of Example 5 is disposed on the inside (image side) of the light-transmissive cover member CG1 and is on the object side of the optical system. The optical system of Example 5 is the same as the optical system of Example 1, and is stored on the inside of the light-transmissive cover member CG1 as in Example 1.

(2) Numerical Example

Figure 15:
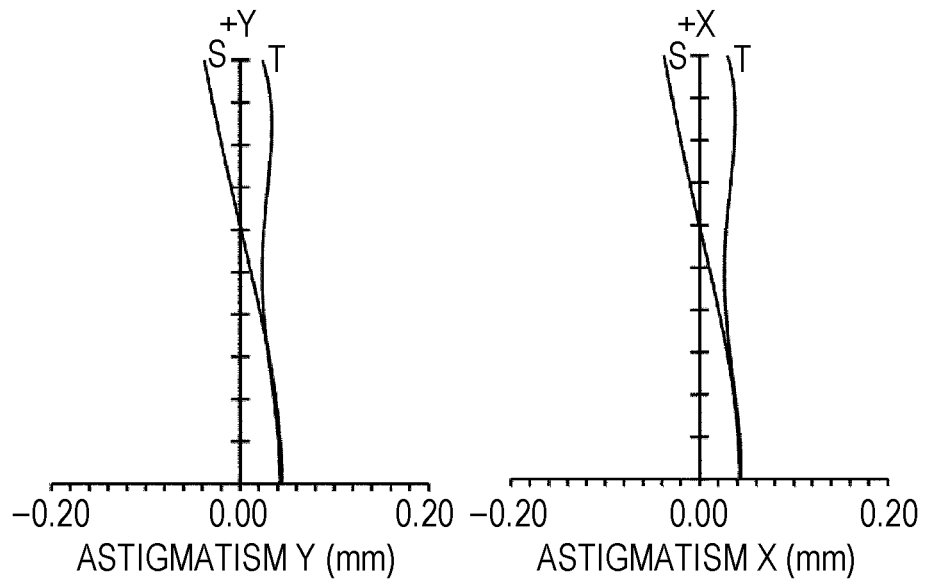
FIG. 15 shows astigmatism charts of the optical system including the correction lens of Example 5 during infinity focus.
Figure 16:
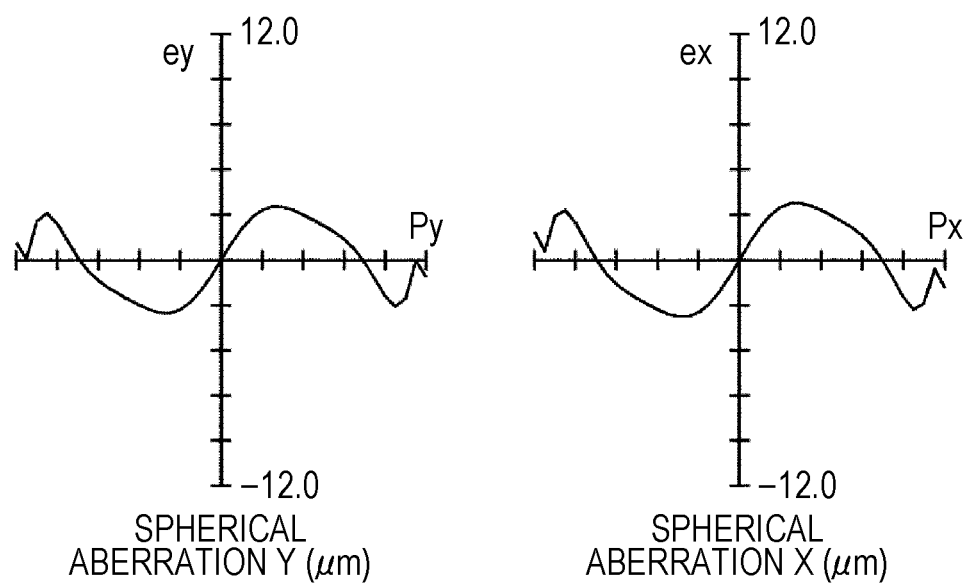
FIG. 16 show spherical aberration charts of the optical system including the correction lens of Example 5 during infinity focus.

Next, a numerical example to which specific numerical values are applied will be described. Surface data of the light-transmissive cover member CG1 and the correction lens L1 of Example 5 are represented in Table 7. Surface data and aspheric coefficients of the optical system are the same as data represented in Tables 2 and 3 of Example 1. In Table 28, values of Conditional Inequality (1) to Conditional Inequality (3) are represented. FIGS. 15 and 16 show astigmatism charts and spherical aberration charts of the optical system including the correction lens L1 and the light-transmissive cover member CG1 of Example 5 during infinity focus.

TABLE 7

| Surface number | Type | RX | RY | D | N |
|---|---|---|---|---|---|
| 1 | CYLINDRICAL | 100.000 | INF | 3.000 | 1.58547 |
| 2 | CYLINDRICAL | 97.000 | INF | 40.000 | |
| 3 | TOROIDAL | −63.690 | −78.910 | 3.000 | 1.58547 |
| 4 | TOROIDAL | −64.000 | −80.000 | 2.000 | |

Example 6

(1) Optical Configuration of Optical System

Figure 17A:
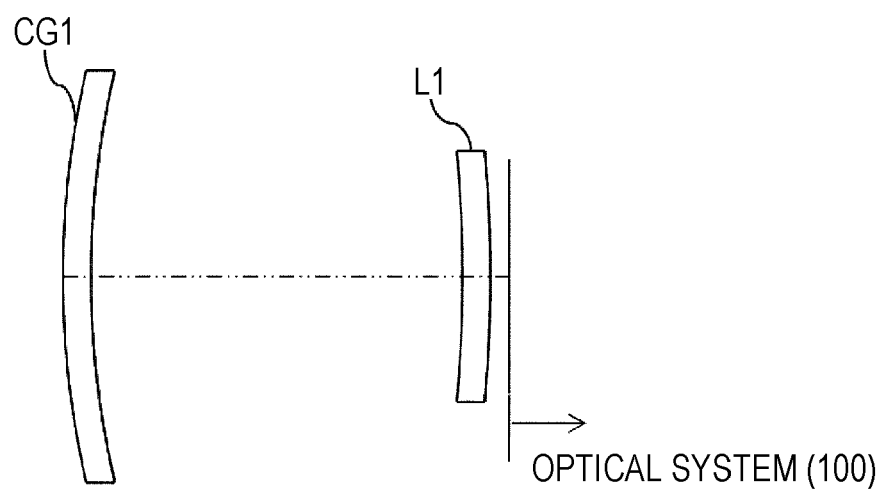
FIG. 17A is a lens cross-sectional views of an optical system including a correction lens of Example 6 of the present invention on the X-Z plane during infinity focus.
Figure 17B:
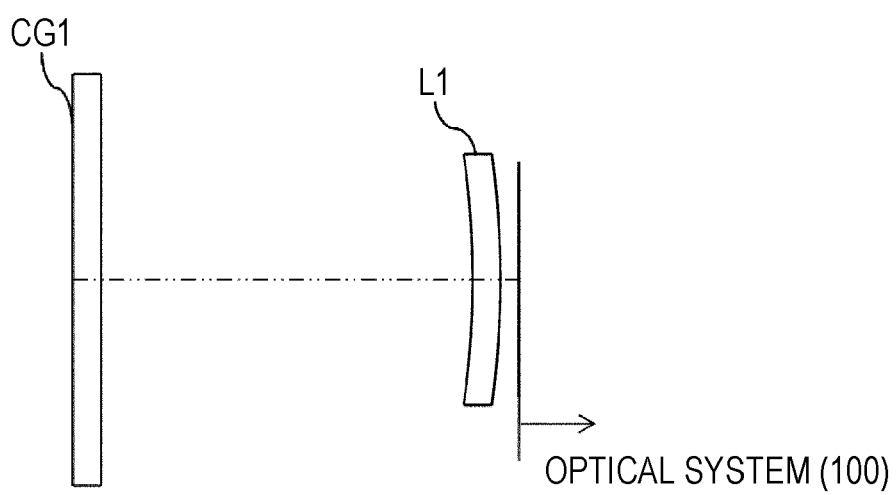
FIG. 17B is a lens cross-sectional views of an optical system including a correction lens of Example 6 of the present invention on the Y-Z plane during infinity focus.

FIG. 17A is a lens cross-sectional views of an optical system including a correction lens of Example 6 of the present invention on the X-Z plane during infinity focus, and FIG. 17B is a lens cross-sectional views of an optical system including a correction lens of Example 6 of the present invention on the Y-Z plane during infinity focus. The correction lens L1 of Example 6 is disposed on the inside (image side) of the light-transmissive cover member CG1 and is on the object side of the optical system. The optical system of Example 6 is the same as the optical system of Example 1, and is stored on the inside of the light-transmissive cover member CG1 as in Example 1.

(2) Numerical Example

Figure 18:
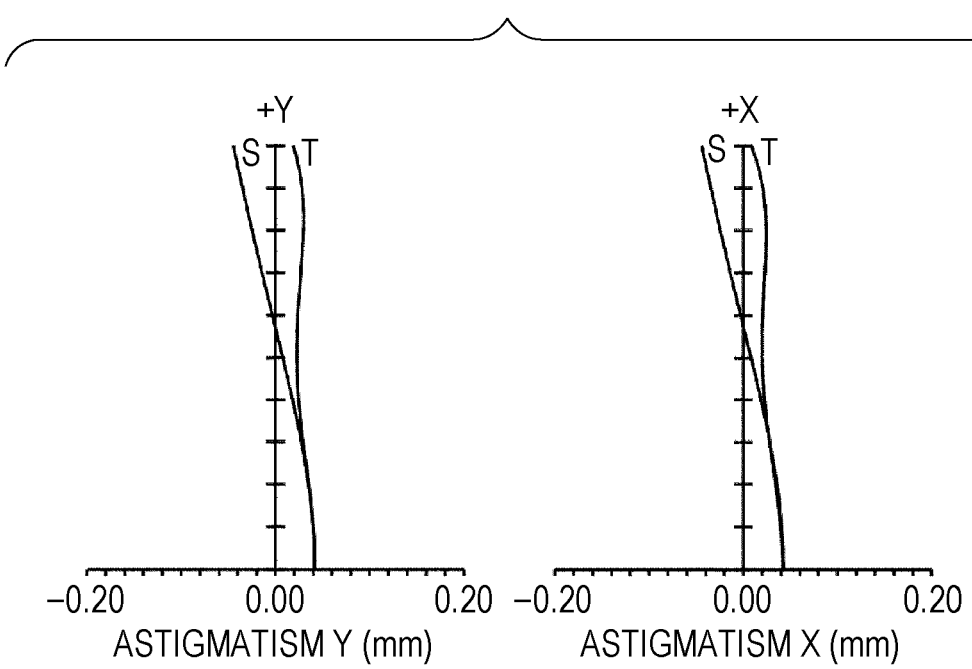
FIG. 18 shows astigmatism charts of the optical system including the correction lens of Example 6 during infinity focus.
Figure 19:
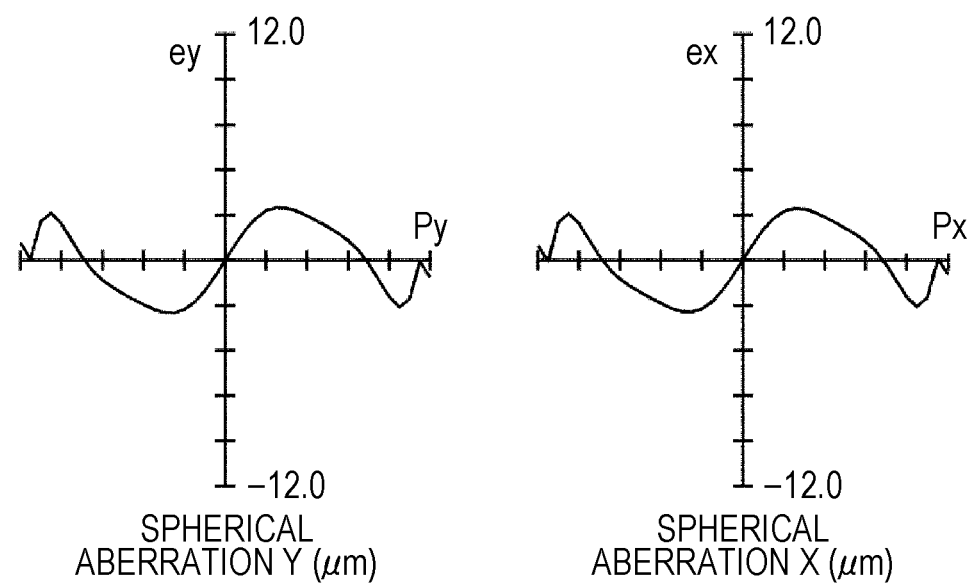
FIG. 19 show spherical aberration charts of the optical system including the correction lens of Example 6 during infinity focus.

Next, a numerical example to which specific numerical values are applied will be described. Surface data of the light-transmissive cover member CG1 and the correction lens L1 of Example 6 are represented in Table 8. Surface data and aspheric coefficients of the optical system are the same as data represented in Tables 2 and 3 of Example 1. In Table 28, values of Conditional Inequality (1) to Conditional Inequality (3) are represented. FIGS. 18 and 19 show astigmatism charts and spherical aberration charts of the optical system including the correction lens L1 and the light-transmissive cover member CG1 of Example 6 during infinity focus.

TABLE 8

| Surface number | Type | RX | RY | D | N |
|---|---|---|---|---|---|
| 1 | CYLINDRICAL | 100.000 | INF | 3.000 | 1.58547 |
| 2 | CYLINDRICAL | 97.000 | INF | 40.000 | |
| 3 | TOROIDAL | −145.900 | −98.915 | 3.000 | 1.58547 |
| 4 | TOROIDAL | −142.850 | −100.000 | 2.000 | |

Example 7

(1) Optical Configuration of Optical System

Figure 20A:
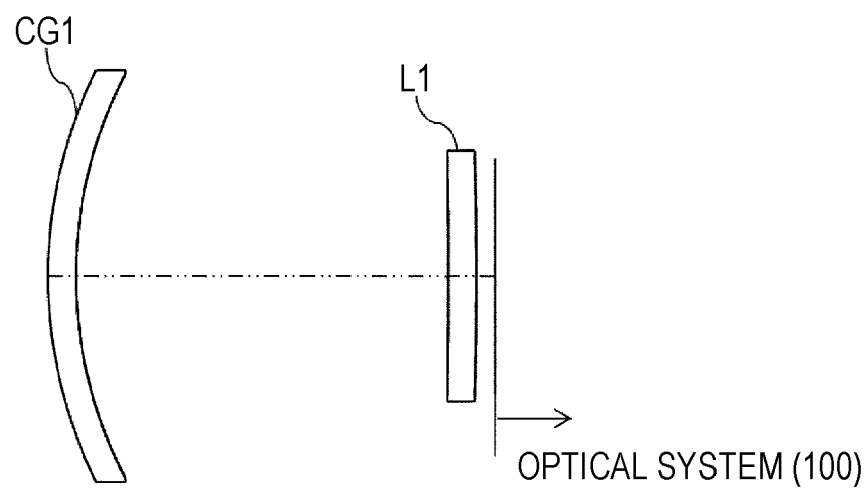
FIG. 20A is a lens cross-sectional view of an optical system including a correction lens of Example 7 of the present invention on the X-Z plane during infinity focus.
Figure 20B:
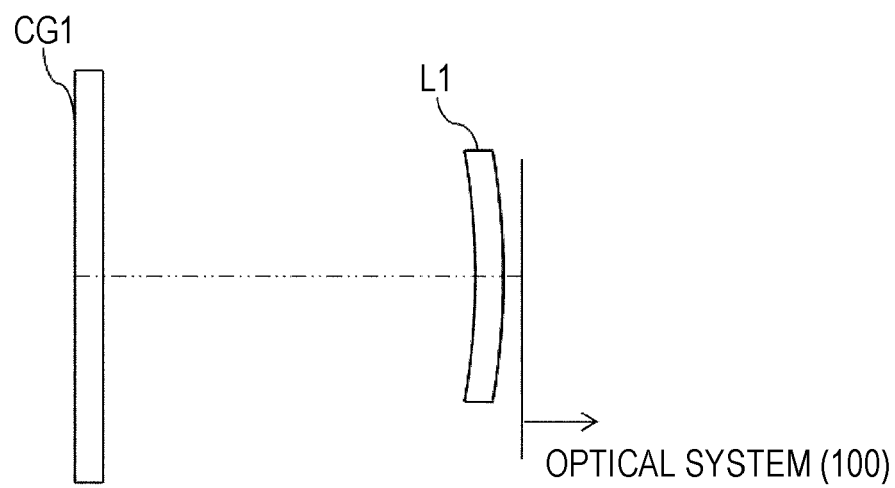
FIG. 20B is a lens cross-sectional view of an optical system including a correction lens of Example 7 of the present invention on the Y-Z plane during infinity focus.

FIG. 20A is a lens cross-sectional view of an optical system including a correction lens of Example 7 of the present invention on the X-Z plane during infinity focus, and FIG. 20B is a lens cross-sectional view of an optical system including a correction lens of Example 7 of the present invention on the Y-Z plane during infinity focus. The correction lens L1 of Example 7 is disposed on the inside (image side) of the light-transmissive cover member CG1 and is on the object side of the optical system. The optical system of Example 7 is the same as the optical system of Example 1, and is stored on the inside of the light-transmissive cover member CG1 as in Example 1.

(2) Numerical Example

Figure 21:
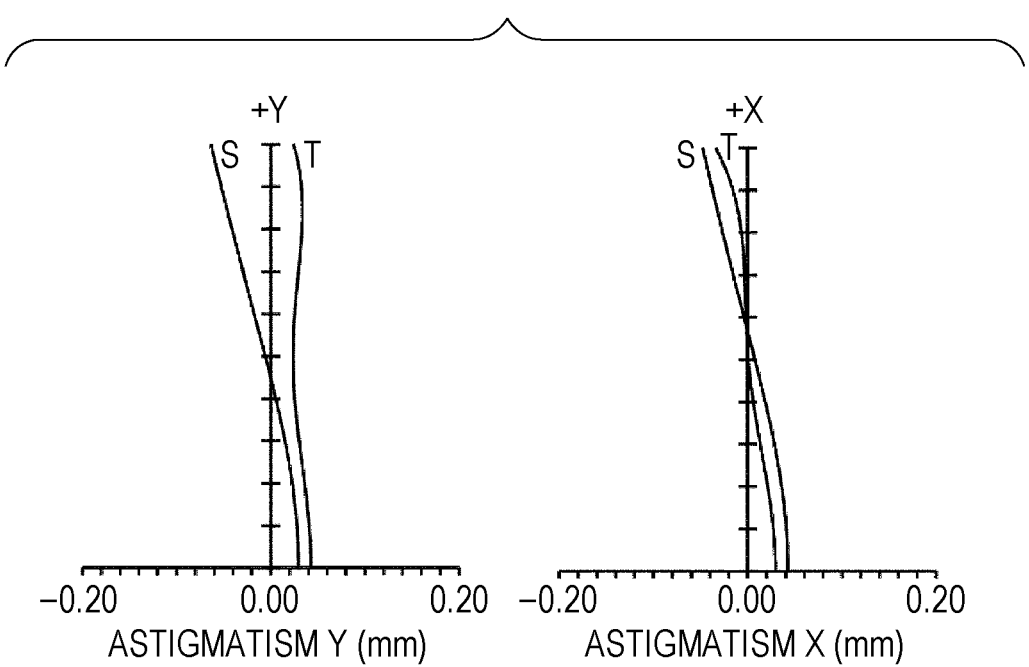
FIG. 21 shows astigmatism charts of the optical system including the correction lens of Example 7 during infinity focus.
Figure 22:
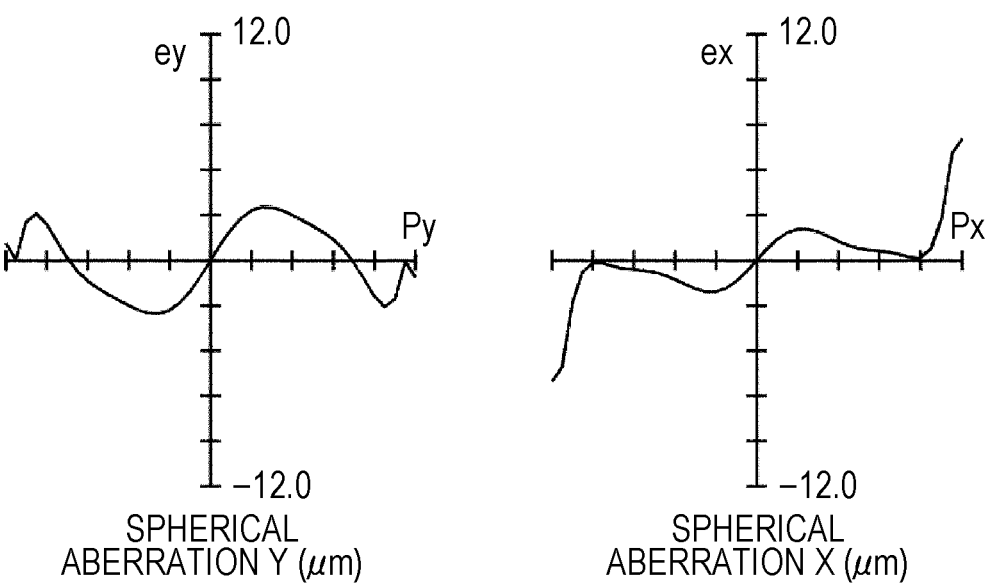
FIG. 22 show spherical aberration charts of the optical system including the correction lens of Example 7 during infinity focus.

Next, a numerical example to which specific numerical values are applied will be described. Surface data of the light-transmissive cover member CG1 and the correction lens L1 of Example 7 are represented in Table 9. Surface data and aspheric coefficients of the optical system are the same as data represented in Tables 2 and 3 of Example 1. In Table 28, values of Conditional Inequality (1) to Conditional Inequality (3) are represented. FIGS. 21 and 22 show astigmatism charts and spherical aberration charts of the optical system including the correction lens L1 and the light-transmissive cover member CG1 of Example 7 during infinity focus.

TABLE 9

| Surface number | Type | RX | RY | D | N |
|---|---|---|---|---|---|
| 1 | CYLINDRICAL | 50.000 | INF | 3.000 | 1.58547 |
| 2 | CYLINDRICAL | 47.000 | INF | 40.000 | |
| 3 | TOROIDAL | −860.000 | −78.910 | 3.000 | 1.58547 |
| 4 | TOROIDAL | −500.000 | −80.000 | 2.000 | |

Example 8

(1) Optical Configuration of Optical System

Figure 23A:
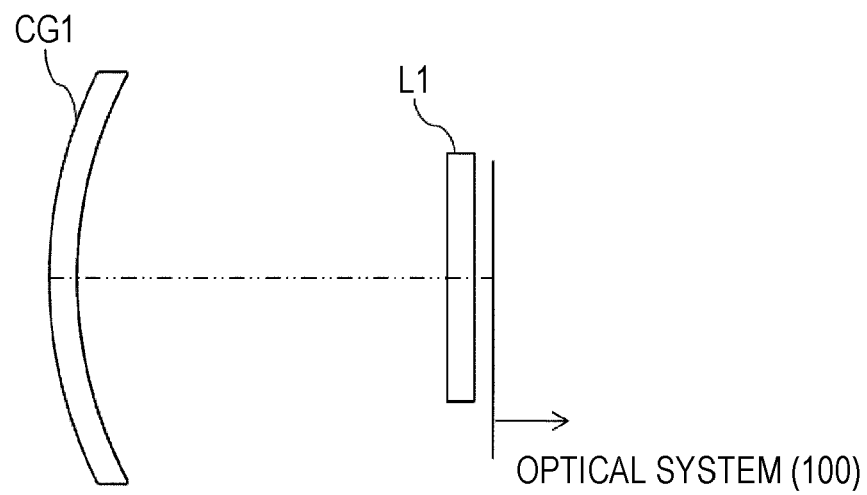
FIG. 23A is a lens cross-sectional views of an optical system including a correction lens of Example 8 of the present invention on the X-Z plane during infinity focus.
Figure 23B:
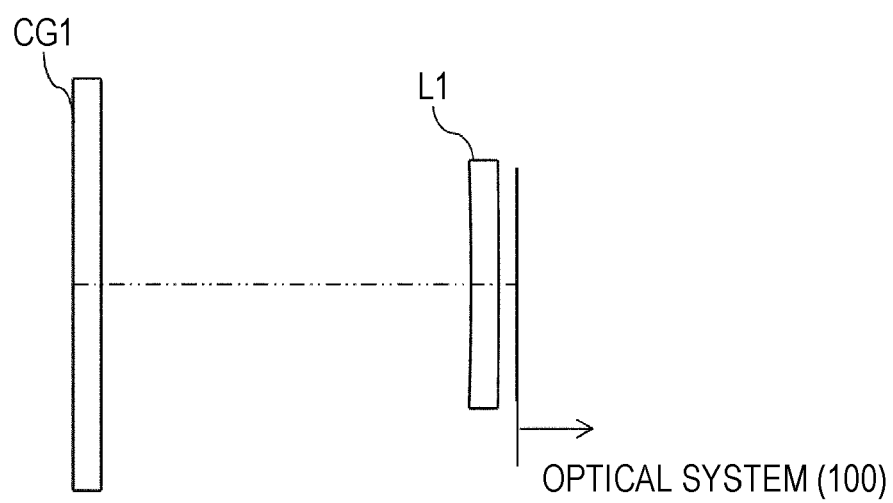
FIG. 23B is a lens cross-sectional views of an optical system including a correction lens of Example 8 of the present invention on the Y-Z plane during infinity focus.

FIG. 23A is a lens cross-sectional views of an optical system including a correction lens of Example 8 of the present invention on the X-Z plane during infinity focus, and FIG. 23B is a lens cross-sectional views of an optical system including a correction lens of Example 8 of the present invention on the Y-Z plane during infinity focus. The correction lens L1 of Example 8 is disposed on the inside (image side) of the light-transmissive cover member CG1 and is on the object side of the optical system. The optical system of Example 8 is the same as the optical system of Example 1, and is stored on the inside of the light-transmissive cover member CG1 as in Example 1.

(2) Numerical Example

Figure 24:
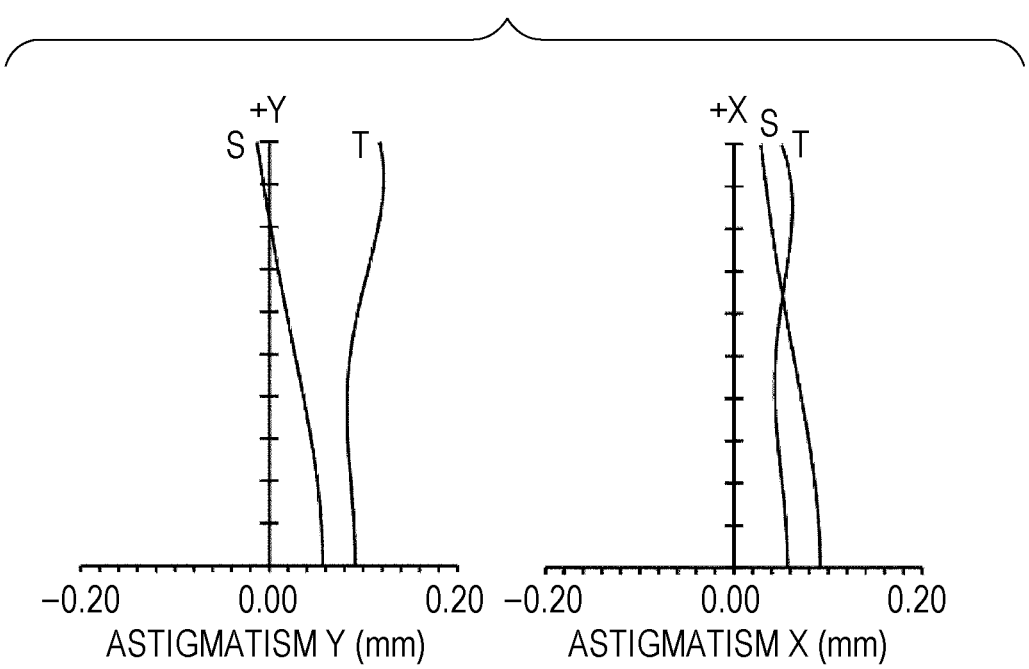
FIG. 24 shows astigmatism charts of the optical system including the correction lens of Example 8 during infinity focus.
Figure 25:
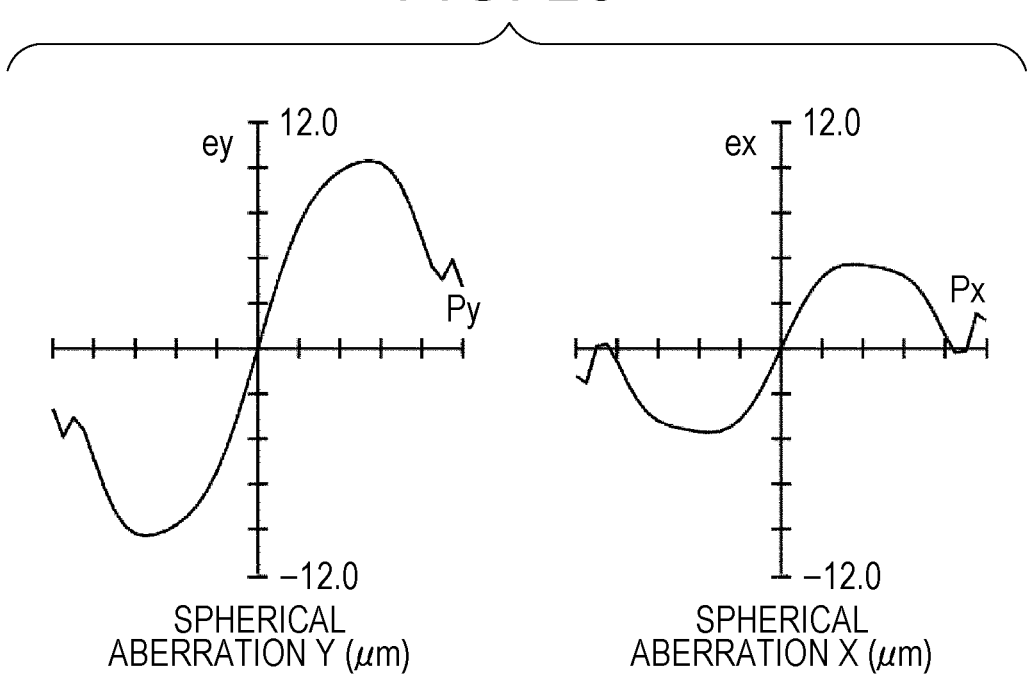
FIG. 25 show spherical aberration charts of the optical system including the correction lens of Example 8 during infinity focus.

Next, a numerical example to which specific numerical values are applied will be described. Surface data of the light-transmissive cover member CG1 and the correction lens L1 of Example 8 are represented in Table 10. Surface data and aspheric coefficients of the optical system are the same as data represented in Tables 2 and 3 of Example 1. In Table 28, values of Conditional Inequality (1) to Conditional Inequality (3) are represented. FIGS. 24 and 25 show astigmatism charts and spherical aberration charts of the optical system including the correction lens L1 and the light-transmissive cover member CG1 of Example 8 during infinity focus.

TABLE 10

| Surface number | Type | RX | RY | D | N |
|---|---|---|---|---|---|
| 1 | CYLINDRICAL | 50.000 | INF | 3.000 | 1.58547 |
| 2 | CYLINDRICAL | 47.000 | INF | 40.000 | |
| 3 | CYLINDRICAL | INF | −478.000 | 3.000 | 1.58547 |
| 4 | CYLINDRICAL | INF | −830.000 | 2.000 | |

Example 9

(1) Optical Configuration of Optical System

Figure 26A:
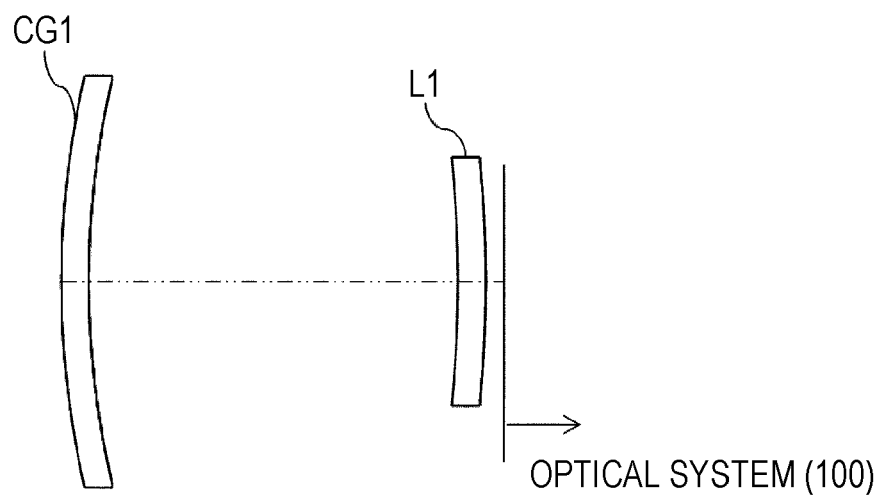
FIG. 26A is a lens cross-sectional views of an optical system including a correction lens of Example 9 of the present invention on the X-Z plane during infinity focus.
Figure 26B:
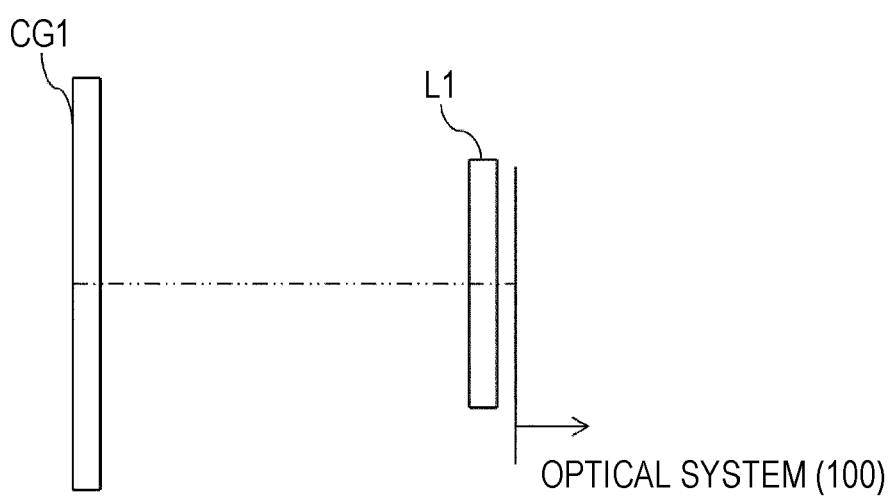
FIG. 26B is a lens cross-sectional views of an optical system including a correction lens of Example 9 of the present invention on the Y-Z plane during infinity focus.

FIG. 26A is a lens cross-sectional views of an optical system including a correction lens of Example 9 of the present invention on the X-Z plane during infinity focus, and FIG. 26B is a lens cross-sectional views of an optical system including a correction lens of Example 9 of the present invention on the Y-Z plane during infinity focus. The correction lens L1 of Example 9 is disposed on the inside (image side) of the light-transmissive cover member CG1 and is on the object side of the optical system. The optical system of Example 9 is the same as the optical system of Example 1, and is stored on the inside of the light-transmissive cover member CG1 as in Example 1.

(2) Numerical Example

Figure 27:
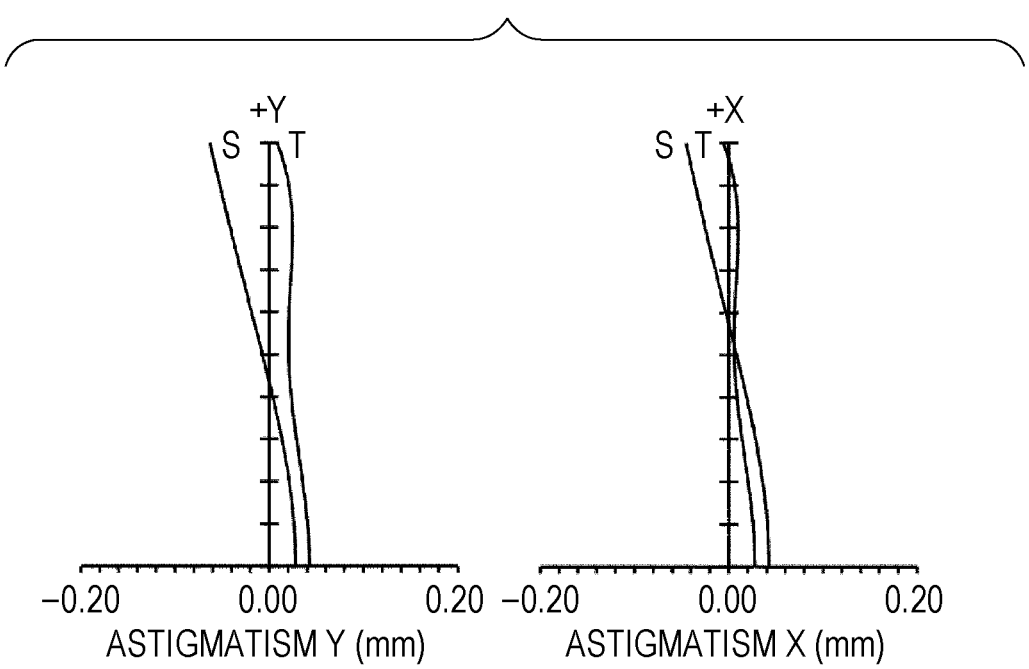
FIG. 27 shows astigmatism charts of the optical system including the correction lens of Example 9 during infinity focus.
Figure 28:
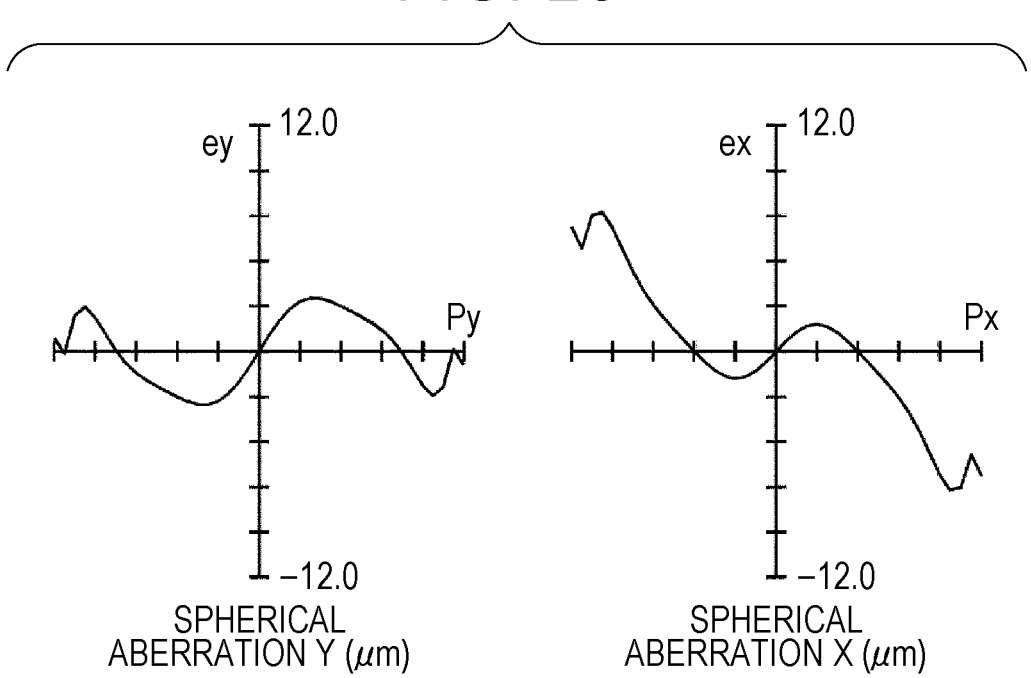
FIG. 28 show spherical aberration charts of the optical system including the correction lens of Example 9 during infinity focus.

Next, a numerical example to which specific numerical values are applied will be described. Surface data of the light-transmissive cover member CG1 and the correction lens L1 of Example 9 are represented in Table 11. Surface data and aspheric coefficients of the optical system are the same as data represented in Tables 2 and 3 of Example 1. In Table 28, values of Conditional Inequality (1) to Conditional Inequality (3) are represented. FIGS. 27 and 28 show astigmatism charts and spherical aberration charts of the optical system including the correction lens L1 and the light-transmissive cover member CG1 of Example 9 during infinity focus.

TABLE 11

| Surface number | Type | RX | RY | D | N |
|---|---|---|---|---|---|
| 1 | CYLINDRICAL | 100.000 | INF | 3.000 | 1.58547 |
| 2 | CYLINDRICAL | 97.000 | INF | 40.000 | |
| 3 | CYLINDRICAL | −132.300 | INF | 3.000 | 1.66134 |
| 4 | CYLINDRICAL | −130.000 | INF | 2.000 | |

Example 10

(1) Optical Configuration of Optical System

Figure 29A:
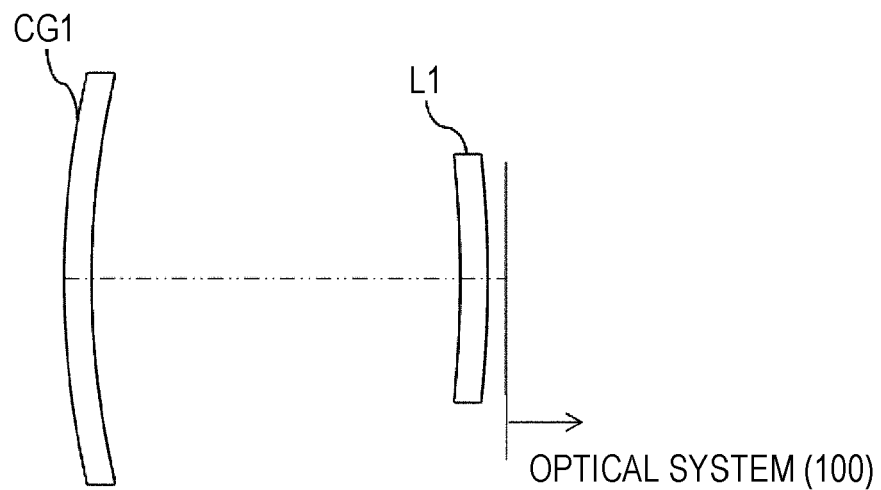
FIG. 29A is a lens cross-sectional views of an optical system including a correction lens of Example 10 of the present invention on the X-Z plane during infinity focus.
Figure 29B:
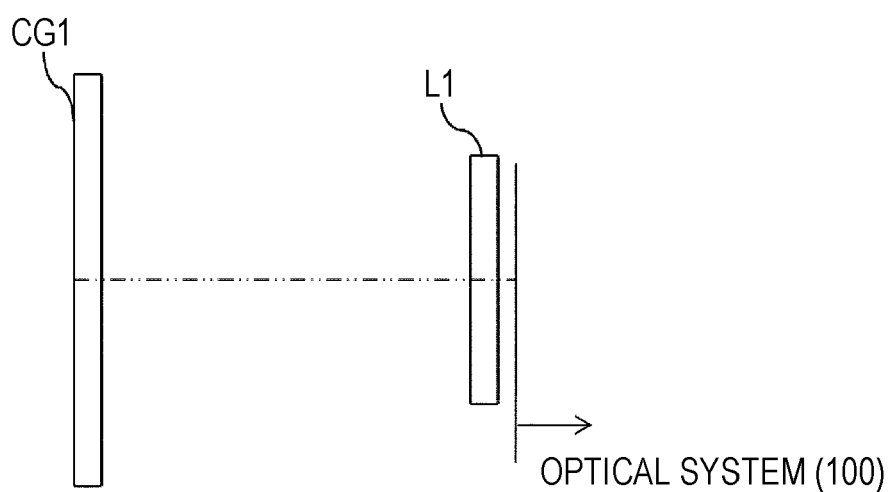
FIG. 29B is a lens cross-sectional views of an optical system including a correction lens of Example 10 of the present invention on the Y-Z plane during infinity focus.

FIG. 29A is a lens cross-sectional views of an optical system including a correction lens of Example 10 of the present invention on the X-Z plane during infinity focus, and FIG. 29B is a lens cross-sectional views of an optical system including a correction lens of Example 10 of the present invention on the Y-Z plane during infinity focus. The correction lens L1 of Example 10 is disposed on the inside (image side) of the light-transmissive cover member CG1 and is on the object side of the optical system. The optical system of Example 10 is the same as the optical system of Example 1, and is stored on the inside of the light-transmissive cover member CG1 as in Example 1.

(2) Numerical Example

Figure 30:
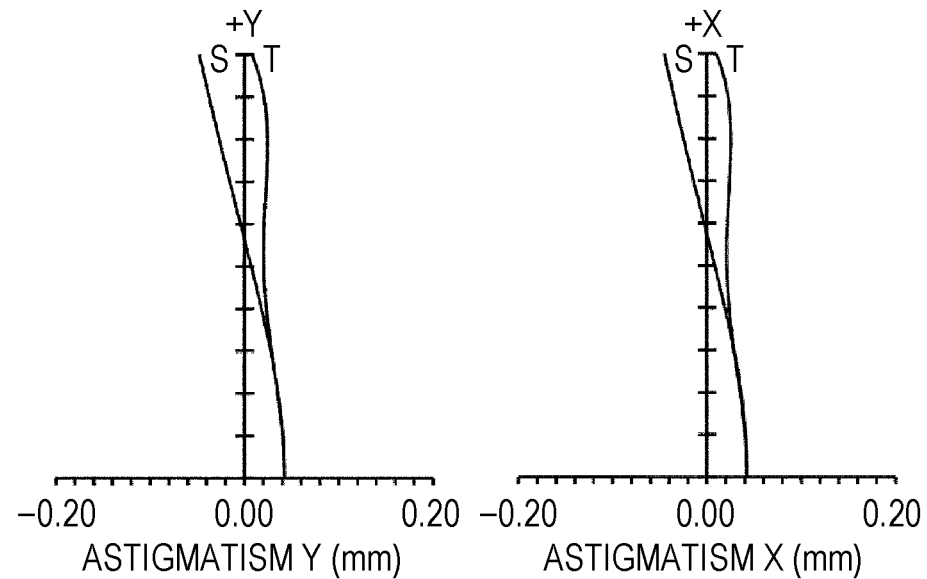
FIG. 30 shows astigmatism charts of the optical system including the correction lens of Example 10 during infinity focus.
Figure 31:
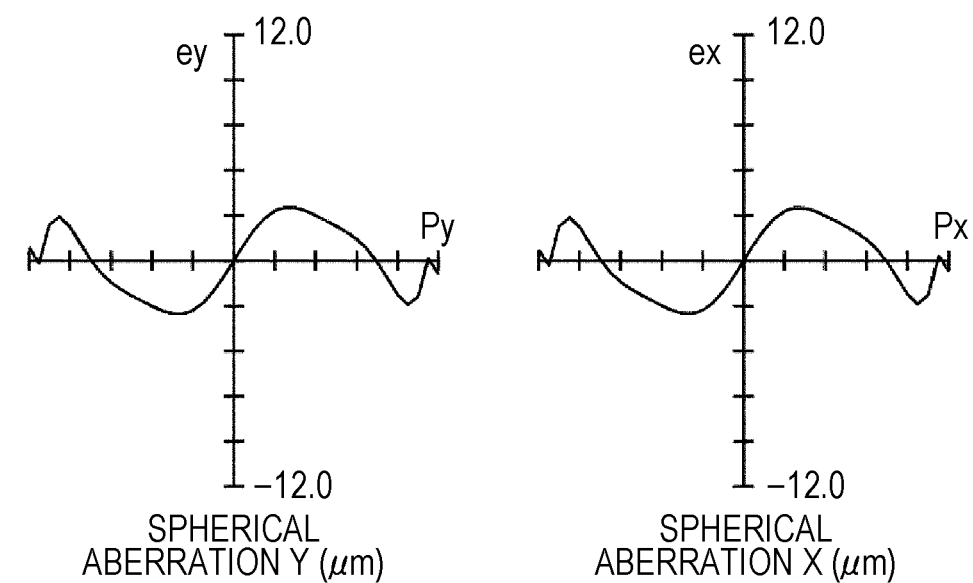
FIG. 31 show spherical aberration charts of the optical system including the correction lens of Example 10 during infinity focus.

Next, a numerical example to which specific numerical values are applied will be described. Surface data of the light-transmissive cover member CG1 and the correction lens L1 of Example 10 are represented in Table 12. Surface data and aspheric coefficients of the optical system are the same as data represented in Tables 2 and 3 of Example 1. In Table 28, values of Conditional Inequality (1) to Conditional Inequality (3) are represented. FIGS. 30 and 31 show astigmatism charts and spherical aberration charts of the optical system including the light-transmissive cover member CG1 and the correction lens L1 of Example 10 during infinity focus.

TABLE 12

| Surface number | Type | RX | RY | D | N |
|---|---|---|---|---|---|
| 1 | CYLINDRICAL | 100.000 | INF | 3.000 | 1.58547 |
| 2 | CYLINDRICAL | 97.000 | INF | 40.000 | |
| 3 | CYLINDRICAL | −132.800 | INF | 3.000 | 1.51680 |
| 4 | CYLINDRICAL | −130.000 | INF | 2.000 | |

TABLE 14-continued

| Surface number | Type | R | D | N |
|---|---|---|---|---|
| 6 | SPH | −234.000 | 0.280 | |
| 7 | ASP | 41.995 | 6.010 | 1.661342 |
| 8 | ASP | 76.460 | 1.000 | |
| 9 | SPH | −69.800 | 1.770 | 1.51633 |
| 10 | SPH | 16.550 | 9.118 | |
| 11 | ASP | −9.505 | 4.550 | 1.661342 |
| 12 | ASP | −12.115 | 0.200 | |
| 13 | SPH | 24.800 | 6.300 | 2.001003 |
| 14 | SPH | −800.000 | 2.000 | |

TABLE 15

| Surface number | k | A4 | A6 | A8 | A10 | A12 |
|---|---|---|---|---|---|---|
| 7 | 8.5742 | −4.9696E−05 | −1.5222E−07 | 2.0419E−10 | −2.8640E−12 | 1.3119E−15 |
| 8 | 34.1227 | −9.5575E−05 | −1.5792E−07 | 1.5704E−09 | −7.3151E−12 | 2.7879E−14 |
| 11 | −0.9538 | −7.0871E−05 | 1.8601E−07 | 1.1869E−08 | 4.1195E−11 | −4.5814E−13 |
| 12 | −0.1231 | 4.0736E−05 | 4.5702E−07 | 2.2723E−09 | 2.0906E−11 | −9.0618E−15 |

Example 11

(1) Optical Configuration of Optical System

Figure 32:
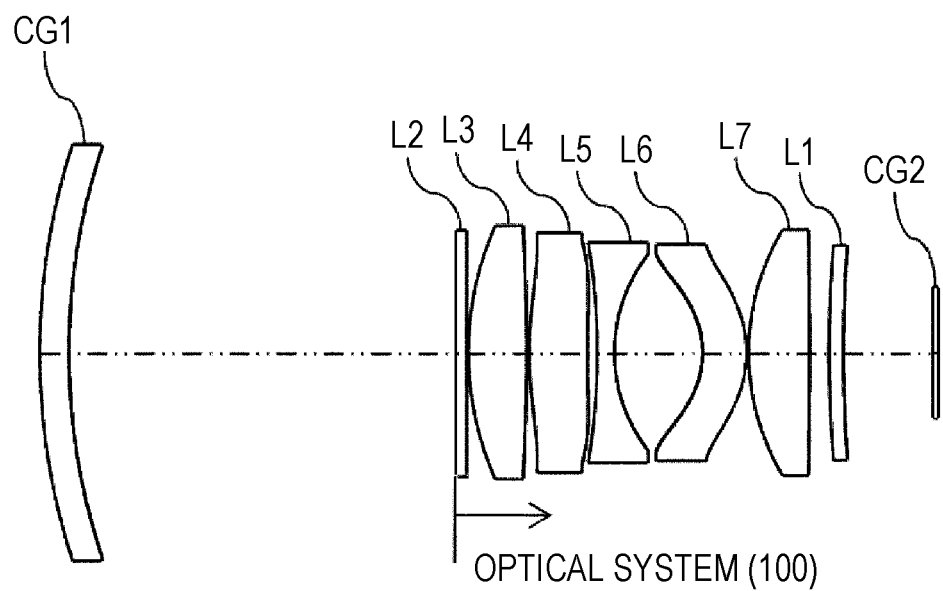
FIG. 32 is a lens cross-sectional view of an optical system including a correction lens of Example 11 of the present invention on the X-Z plane during infinity focus.
Figure 33:
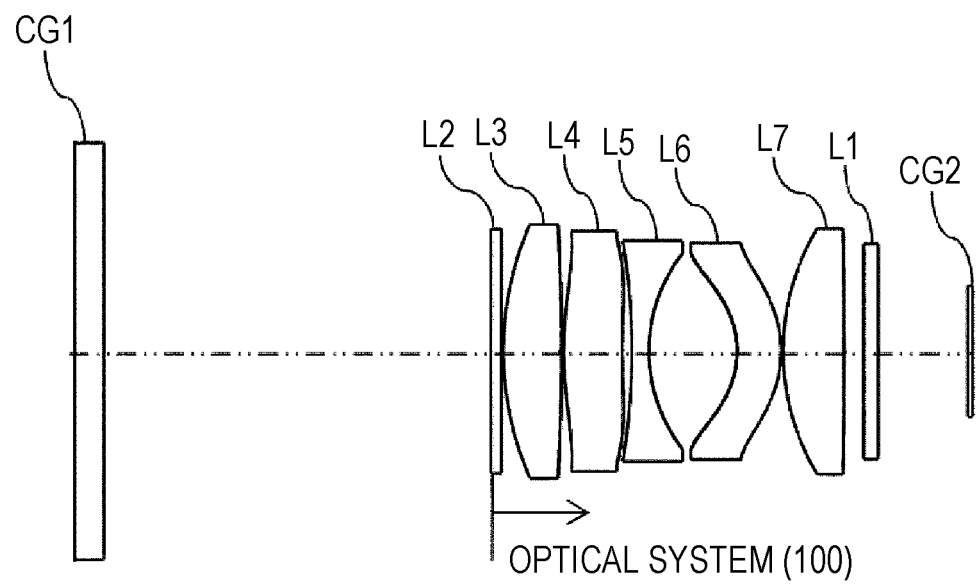
FIG. 33 is a lens cross-sectional view of the optical system including the correction lens of Example 11 on the Y-Z plane during infinite focus.

FIGS. 32 and 33 are lens cross-sectional views of an optical system including a correction lens of Example 11 on the X-Z plane and the Y-Z plane during infinity focus. The correction lens L1 of Example 11 is substantially the same as that of Example 1 except that the correction lens is disposed on the image side of the optical system 100 and is disposed on the object side of the cover glass CG2.

(2) Numerical Example

Figure 34:
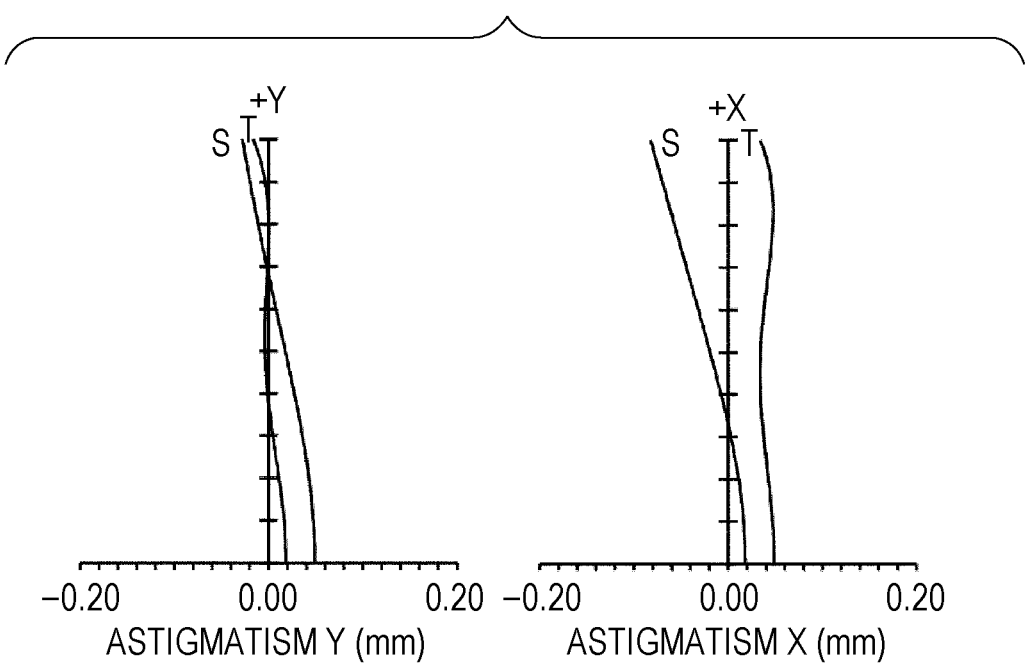
FIG. 34 shows astigmatism charts of the optical system including the correction lens of Example 11 during infinity focus.
Figure 35:
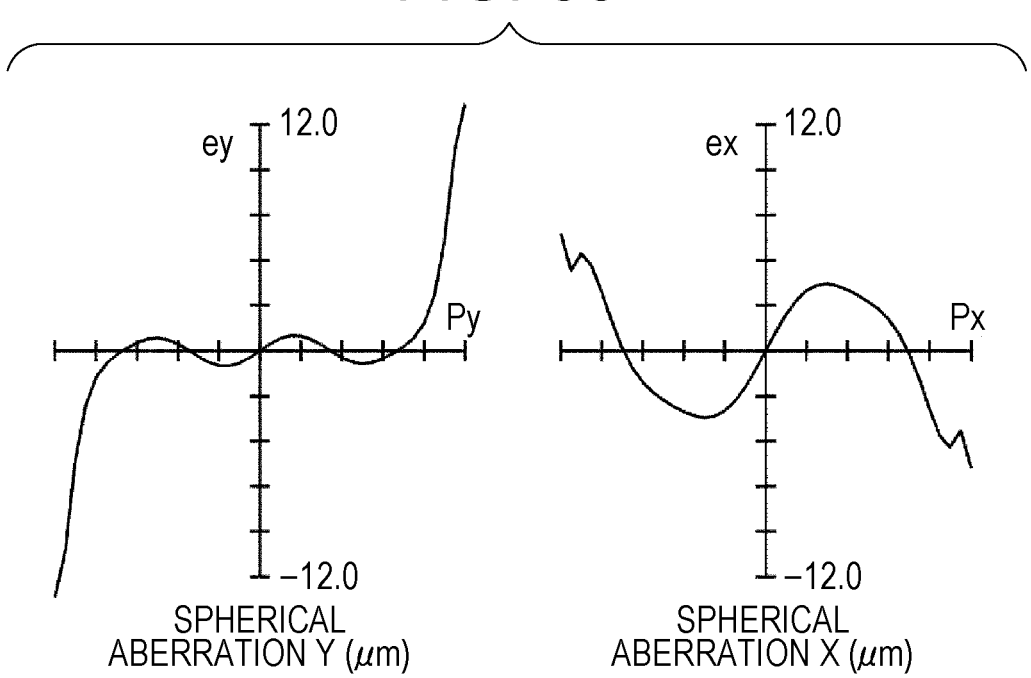
FIG. 35 show spherical aberration charts of the optical system including the correction lens of Example 11 during infinity focus.

Next, a numerical example to which specific numerical values are applied will be described. Surface data of the light-transmissive cover member CG1 of Example 11 are represented in Table 13. Surface data and aspheric coefficients of the optical system are represented in Tables 14 and 15. Surface data of the correction lens are represented in Table 16, and surface data of the cover glass CG2 are represented in Table 17. In Table 28, values of Conditional Inequality (1) to Conditional Inequality (3) are represented. FIGS. 34 and 35 show astigmatism charts and spherical aberration charts of the optical system including the correction lens L1 and the light-transmissive cover member CG1 of Example 11 during infinity focus.

TABLE 13

| Surface number | Type | RX | RY | D | N |
|---|---|---|---|---|---|
| 1 | CYLINDRICAL | 70.000 | INF | 3.000 | 1.58047 |
| 2 | CYLINDRICAL | 67.000 | INF | 40.000 | |

TABLE 14

| Surface number | Type | R | D | N |
|---|---|---|---|---|
| 3 | SPH | INF | 1.100 | 1.51633 |
| 4 | STO | INF | 0.200 | |
| 5 | SPH | 32.740 | 6.000 | 2.001003 |

TABLE 16

| Surface number | Type | RX | RY | D | N |
|---|---|---|---|---|---|
| 15 | CYLINDRICAL | 124.000 | INF | 1.500 | 1.58547 |
| 16 | CYLINDRICAL | 150.000 | INF | 9.207 | |

TABLE 17

| Surface number | Type | R | D | N |
|---|---|---|---|---|
| 17 | SPH | INF | 0.500 | 1.51633 |

Example 12

(1) Optical Configuration of Optical System

Figure 36:
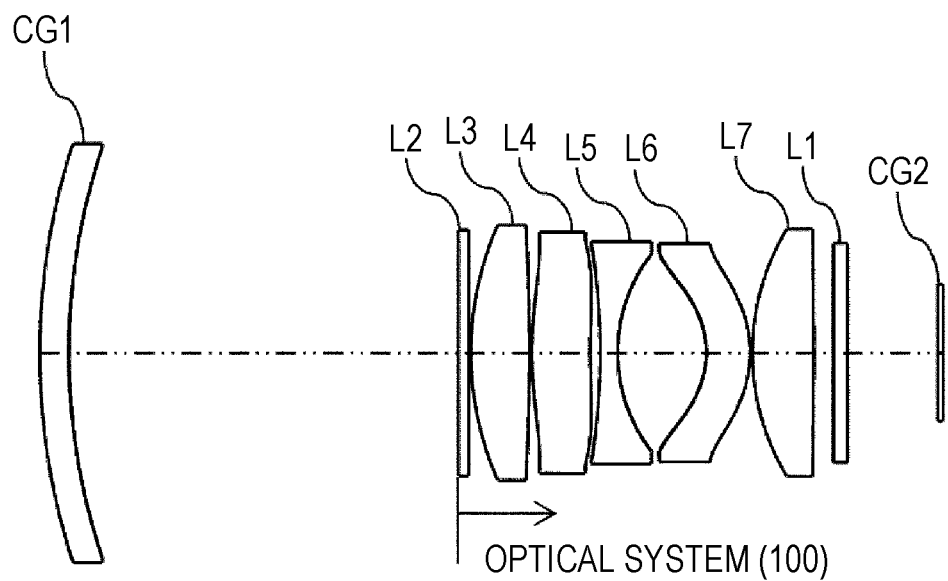
FIG. 36 is a lens cross-sectional view of an optical system including a correction lens of Example 12 of the present invention on the X-Z plane during infinity focus.
Figure 37:
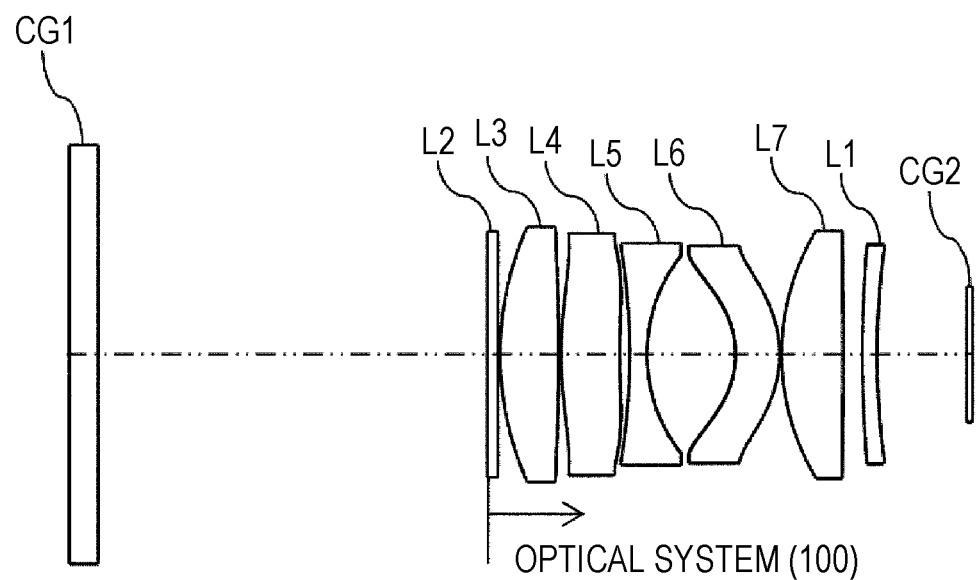
FIG. 37 is a lens cross-sectional view of the optical system including the correction lens of Example 12 on the Y-Z plane during infinite focus.

FIGS. 36 and 37 are lens cross-sectional views of an optical system including a correction lens of Example 12 on the X-Z plane and the Y-Z plane during infinity focus. The correction lens L1 of Example 12 is substantially the same as that of Example 1 except that the correction lens is disposed on the image side of the optical system 100 and is disposed on the object side of the cover glass CG2.

(2) Numerical Example

Figure 38:
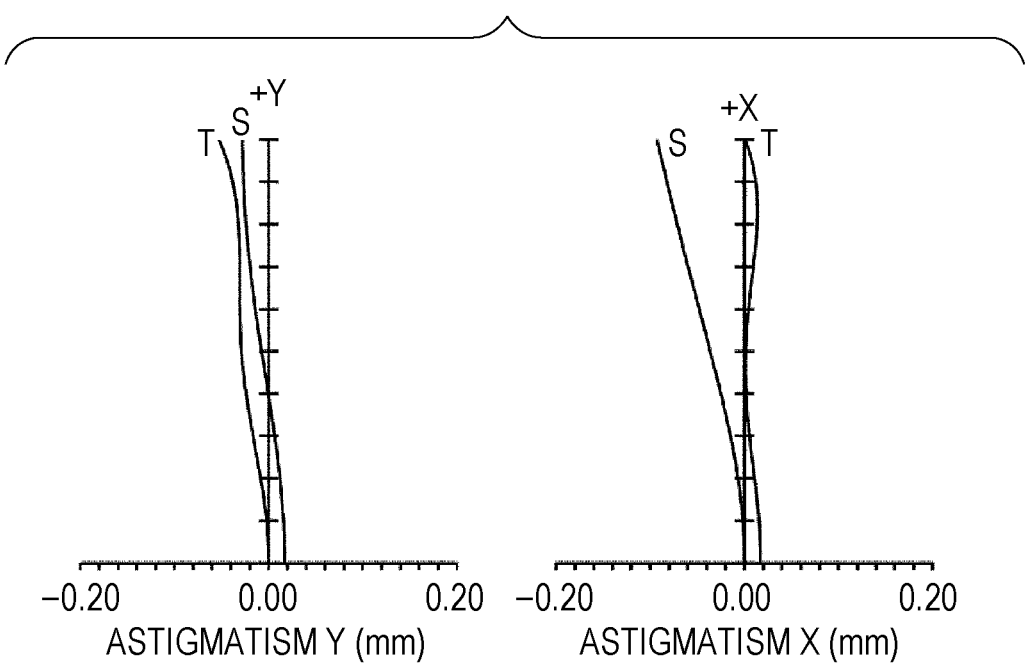
FIG. 38 shows astigmatism charts of the optical system including the correction lens of Example 12 during infinity focus.
Figure 39:
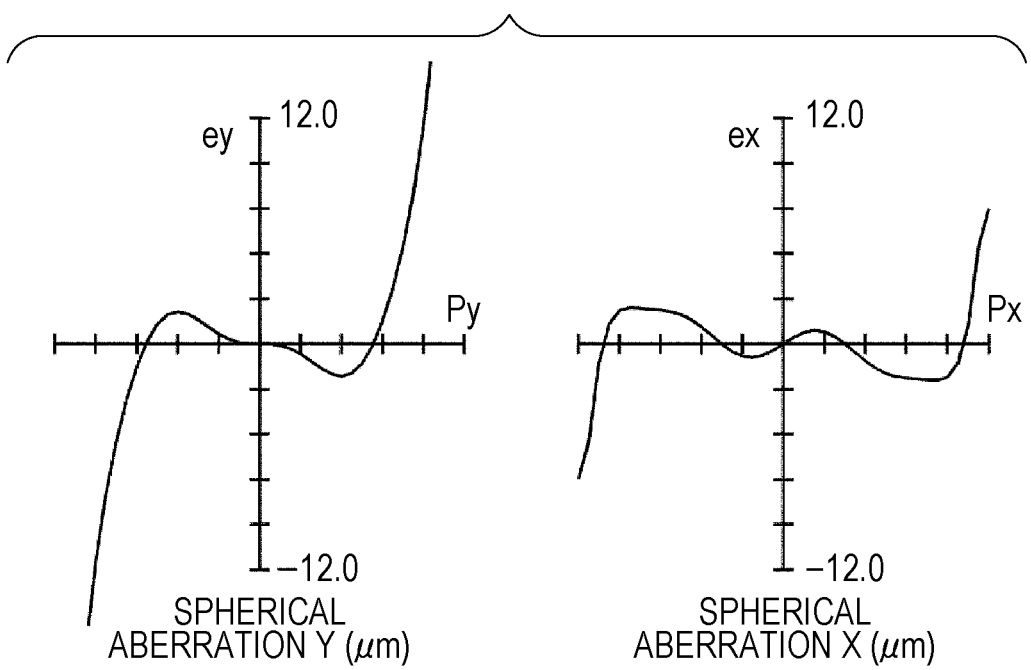
FIG. 39 show spherical aberration charts of the optical system including the correction lens of Example 12 during infinity focus.

Next, a numerical example to which specific numerical values are applied will be described. Surface data of the light-transmissive cover member CG1 of Example 12 are represented in Table 18. Surface data and aspheric coefficients of the optical system are represented in Tables 19 and 20. Surface data of the correction lens are represented in Table 21, and surface data of the cover glass CG2 are represented in Table 22. In Table 28, values of Conditional Inequality (1) to Conditional Inequality (3) are represented. FIGS. 38 and 39 show astigmatism charts and spherical aberration charts of the optical system including the correction lens L1 and the light-transmissive cover member CG1 of Example 12 during infinity focus.

TABLE 18

| Surface number | Type | RX | RY | D | N |
|---|---|---|---|---|---|
| 1 | CYLINDRICAL | 70.000 | INF | 3.000 | 1.58547 |
| 2 | CYLINDRICAL | 67.000 | INF | 40.000 | |

TABLE 19

| Surface number | Type | R | D | N |
|---|---|---|---|---|
| 3 | SPH | INF | 1.100 | 1.51633 |
| 4 | STO | INF | 0.200 | |
| 5 | SPH | 32.740 | 6.000 | 2.001003 |
| 6 | SPH | −234.000 | 0.280 | |
| 7 | ASP | 41.995 | 6.010 | 1.661342 |
| 8 | ASP | 76.460 | 1.000 | |
| 9 | SPH | −69.800 | 1.770 | 1.51633 |
| 10 | SPH | 16.550 | 9.118 | |
| 11 | ASP | −9.505 | 4.550 | 1.661342 |
| 12 | ASP | −12.115 | 0.200 | |
| 13 | SPH | 24.800 | 6.300 | 2.001003 |
| 14 | SPH | −800.000 | 2.000 | |

TABLE 20

| Surface number | k | A4 | A6 | A8 | A10 | A12 |
|---|---|---|---|---|---|---|
| 7 | 8.5742 | −4.9696E−05 | −1.5222E−07 | 2.0419E−10 | −2.8640E−12 | 1.3119E−15 |
| 8 | 34.1227 | −9.5575E−05 | −1.5792E−07 | 1.5704E−09 | −7.3151E−12 | 2.7879E−14 |
| 11 | −0.9538 | −7.0871E−05 | 1.6601E−07 | 1.1869E−08 | 4.1195E−11 | −4.5814E−13 |
| 12 | −0.1231 | 4.0736E−05 | 4.5702E−07 | 2.2723E−09 | 2.0966E−11 | −9.0618E−15 |

TABLE 21

| Surface number | Type | RX | RY | D | N |
|---|---|---|---|---|---|
| 15 | CYLINDRICAL | INF | 130.000 | 1.500 | 1.58547 |
| 16 | CYLINDRICAL | INF | 80.000 | 9.207 | |

TABLE 22

| Surface number | Type | R | D | N |
|---|---|---|---|---|
| 17 | SPH | INF | 0.500 | 1.51633 |

Example 13

(1) Optical Configuration of Optical System

Figure 40:
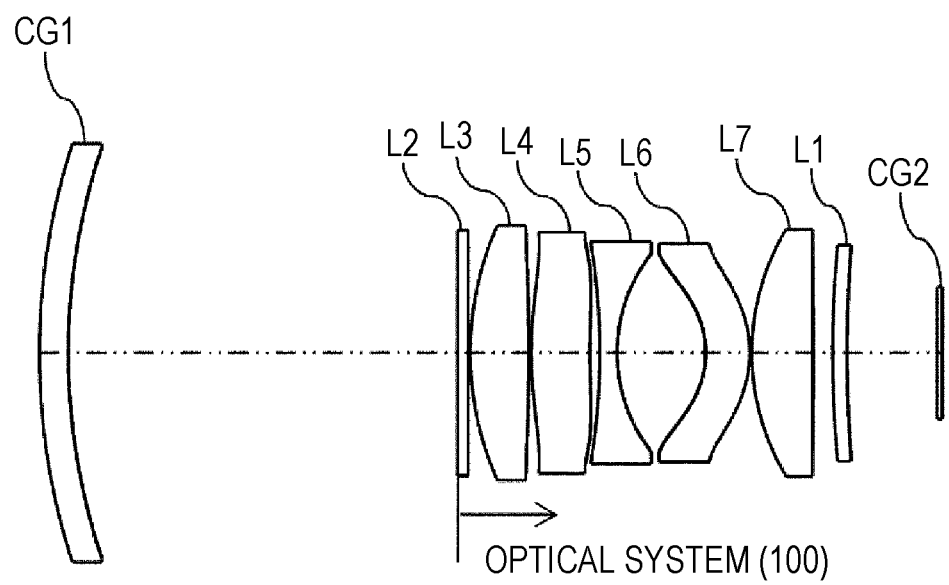
FIG. 40 is a lens cross-sectional view of an optical system including a correction lens of Example 13 of the present invention on the X-Z plane during infinity focus.
Figure 41:
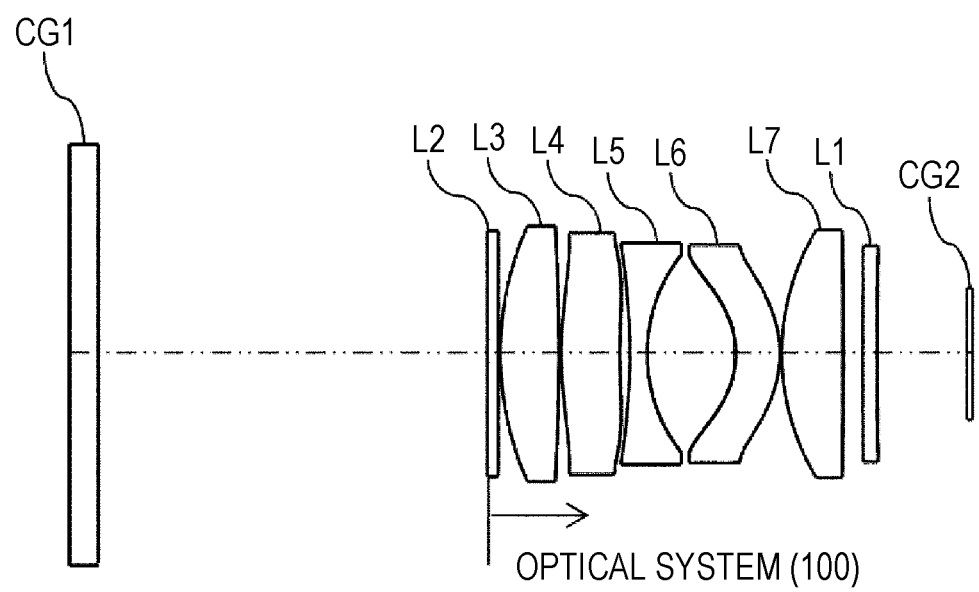
FIG. 41 is a lens cross-sectional view of the optical system including the correction lens of Example 13 on the Y-Z plane during infinite focus.

FIGS. 40 and 41 are lens cross-sectional views of an optical system including a correction lens of Example 13 on the X-Z plane and the Y-Z plane during infinity focus. The correction lens L1 of Example 13 is substantially the same as that of Example 1 except that the correction lens is disposed on the image side of the optical system 100 and is disposed on the object side of the cover glass CG2.

(2) Numerical Example

Figure 42:
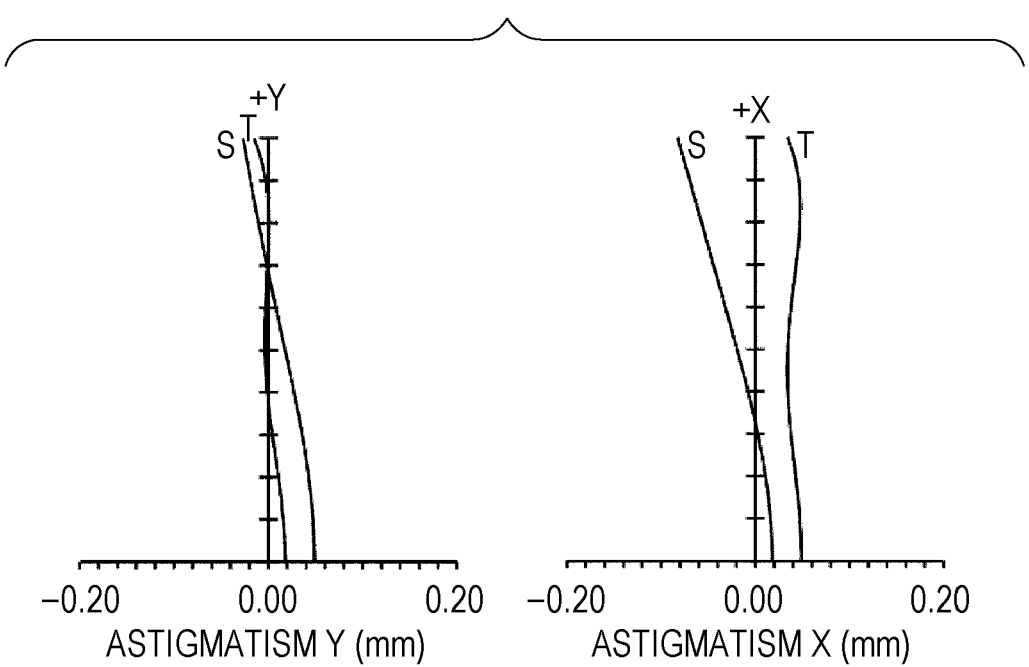
FIG. 42 shows astigmatism charts of the optical system including the correction lens of Example 13 during infinity focus.
Figure 43:
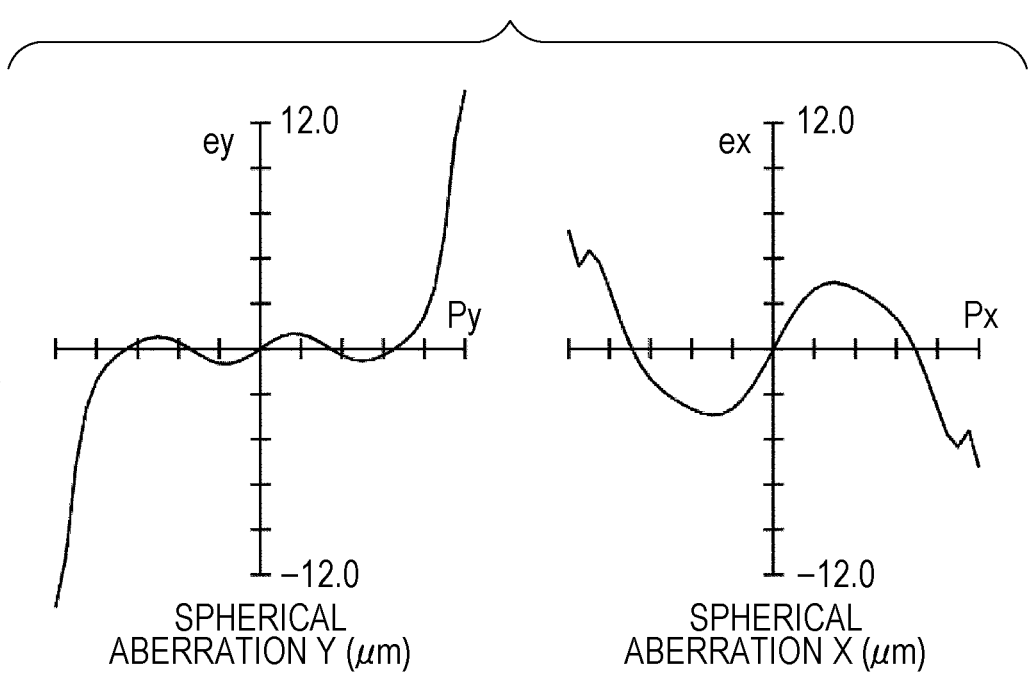
FIG. 43 show spherical aberration charts of the optical system including the correction lens of Example 13 during infinity focus.

Next, a numerical example to which specific numerical values are applied will be described. Surface data of the light-transmissive cover member CG1 of Example 13 are represented in Table 23. Surface data and aspheric coefficients of the optical system are represented in Tables 24 and 25. Surface data of the correction lens are represented in Table 26, and surface data of the cover glass CG2 are represented in Table 27. In Table 28, values of Conditional Inequality (1) to Conditional Inequality (3) are represented. FIGS. 42 and 43 show astigmatism charts and spherical aberration charts of the optical system including the correction lens L1 and the light-transmissive cover member CG1 of Example 13 during infinity focus.

TABLE 23

| Surface number | Type | RX | RY | D | N |
|---|---|---|---|---|---|
| 1 | CYLINDRICAL | 70.000 | INF | 3.000 | 1.58547 |
| 2 | CYLINDRICAL | 67.000 | INF | 40.000 | |

TABLE 24

| Surface number | Type | R | D | N |
|---|---|---|---|---|
| 3 | SPH | INF | 1.100 | 1.51633 |
| 4 | STO | INF | 0.200 | |
| 5 | SPH | 32.740 | 6.000 | 2.00100 |
| 6 | SPH | −234.000 | 0.280 | |
| 7 | ASP | 41.995 | 6.010 | 1.66134 |
| 8 | ASP | 76.460 | 1.000 | |
| 9 | SPH | −69.800 | 1.770 | 1.51633 |
| 10 | SPH | 16.550 | 9.118 | |
| 11 | ASP | −9.505 | 4.550 | 1.66134 |
| 12 | ASP | −12.115 | 0.200 | |
| 13 | SPH | 24.800 | 6.300 | 2.00100 |
| 14 | SPH | −800.000 | 2.000 | |

TABLE 25

| Surface number | k | A4 | A6 | A8 | A10 | A12 |
|---|---|---|---|---|---|---|
| 7 | 8.5742 | −4.9696E−05 | −1.5222E−07 | 2.0419E−10 | −2.8640E−12 | 1.3119E−15 |
| 8 | 34.1227 | −9.5575E−05 | −1.5792E−07 | 1.5704E−09 | −7.3151E−12 | 2.7879E−14 |
| 11 | −0.9538 | −7.0871E−05 | 1.8601E−07 | 1.1869E−08 | 4.1195E−11 | −4.5814E−13 |
| 12 | −0.1231 | 4.0736E−05 | 4.5702E−07 | 2.2723E−09 | 2.0906E−11 | −9.0618E−15 |

TABLE 26

| Surface number | Type | RX | RY | D | N |
|---|---|---|---|---|---|
| 15 | TOROIDAL | 124.000 | 1200.000 | 1.500 | 1.58547 |
| 16 | TOROIDAL | 150.000 | 1000.000 | 9.207 | |

TABLE 27

| Surface number | Type | R | D | N |
|---|---|---|---|---|
| 17 | SPH | INF | 0.500 | 1.51633 |

TABLE 28

| | | Example 1 | Example 2 | Example 3 | Example 4 | Example 5 |
|---|---|---|---|---|---|---|
| (1) | \|R2S/R2L\| | 0.0000 | 0.999 | 0.2000 | 0.3000 | 0.8000 |
| (2) | (\|RAx\| − \|RBx\|)/(\|RAx\| + \|RBx\|) | 0.0018 | 0.0009 | 0.0156 | 0.0324 | 0.0242 |
| (3) | (\|RAy\| − \|RBy\|)/(\|RAy\| + \|RBy\|) | 0.0000 | 0.0068 | 0.0016 | 0.0016 | 0.0068 |

| | | Example 6 | Example 7 | Example 8 | Example 9 | Example 10 |
|---|---|---|---|---|---|---|
| (1) | \|R2S/R2L\| | 0.7000 | 0.2000 | 0.0000 | 0.0000 | 0.0000 |
| (2) | (\|RAx\| − \|RBx\|)/(\|RAx\| + \|RBx\|) | 0.0105 | 0.2647 | 0.0000 | 0.0087 | 0.0106 |
| (3) | (\|RAy\| − \|RBy\|)/(\|RAy\| + \|RBy\|) | 0.0054 | 0.0068 | 0.2691 | 0.0000 | 0.0000 |

| | | Example 11 | Example 12 | Example 13 |
|---|---|---|---|---|
| (1) | \|R2S/R2L\| | 0.0000 | 0.0000 | 0.2000 |
| (2) | (\|RAx\| − \|RBx\|)/(\|RAx\| + \|RBx\|) | 0.0948 | 0.0000 | 0.0948 |
| (3) | (\|RAy\| − \|RBy\|)/(\|RAy\| + \|RBy\|) | 0.0000 | 0.2380 | 0.0909 |

According to the present invention, it is possible to provide the correction lens capable of correcting the shift between the focal position of the first direction component and the focal position of the second direction component in the optical system in which the light-transmissive cover member having the different curvatures in the first direction perpendicular to the optical axis and the second direction perpendicular to the optical axis and the first direction is disposed on the object side, and the imaging apparatus including the correction lens.

What is claimed is:

1. A correction lens used in an optical system in which a light-transmissive cover member having radii of curvature different from each other in a first direction perpendicular to an optical axis and a second direction perpendicular to the optical axis and the first direction is disposed on an object side, wherein radii of curvature of an image-side surface of the correction lens are different in the first direction and the second direction, and the following condition is satisfied:

$$0.0 \le |R2S/R2L| < 1.0 \qquad (1)$$

where

R2S is a radius of curvature of the image-side surface of the correction lens in the first direction or the second direction and has a smaller absolute value, and R2L is a radius of curvature of the image-side surface of the correction lens in the first direction or the second direction and has a larger absolute value, wherein the light-transmissive cover has a refractive power in only one direction of the first direction and the second direction, wherein the correction lens has a refractive power having a different sign from the refractive power of the light-transmissive cover member in the one direction in which the light-transmissive cover member has the refractive power, and wherein the correction lens does not have a substantial refractive power in a direction which is different from the one direction in which the light-transmissive cover member has the refractive power.

2. The correction lens according to claim 1, wherein the following conditions are satisfied:

$$0 \le (|RAx|-|RBx|)/(|RAx|+|RBx|) < 0.27, \text{ and} \qquad (2)$$

$$0 \le (|RAy|-|RBy|)/(|RAy|+|RBy|) < 0.27 \qquad (3)$$

where

RAx is a radius of curvature of an object-side surface or an image-side surface of the correction lens in the first direction and has a larger absolute value, RBx is a radius of curvature of the object-side surface or the image-side surface of the correction lens in the first direction and has a smaller absolute value, RAy is a radius of curvature of the object-side surface or the image-side surface of the correction lens in the second direction and has a larger absolute value, and RBy is a radius of curvature of the object-side surface or the image-side surface of the correction lens in the second direction and has a smaller absolute value.

3. The correction lens according to claim 1, wherein a glass material of the correction lens is same as a glass material of the light-transmissive cover member.

4. A correction lens which is used in an optical system in which a light-transmissive cover member having radius of curvature different from each other in a first direction perpendicular to an optical axis and a second direction perpendicular to the optical axis and the first direction is disposed on an object side and corrects a shift between focal positions caused in the first direction and the second direction by the light-transmissive cover member,
wherein radii of curvature of an image-side surface of the correction lens are different in the first direction and the second direction, and each radius of curvature is set to a different value depending on the radius of curvature of the light-transmissive cover member in each direction,
wherein the light-transmissive cover has a refractive power in only one direction of the first direction and the second direction,
wherein the correction lens has a refractive power having a same sign as the refractive power of the light-transmissive cover member in a direction which is different from the one direction in which the light-transmissive cover member has the refractive power, and
wherein the correction lens does not have a substantial refractive power in the one direction in which the light-transmissive cover member has the refractive power.

5. An imaging apparatus comprising:
the correction lens according to claim 1;
the optical system; and
an image sensor that is disposed closer to an image side than the optical system, and on which an optical image formed by the optical system and the correction lens is incident.

6. The correction lens according to claim 1, wherein the correction lens is disposed on an image side of the light-transmissive cover member and is disposed on an object side of the optical system.

7. The correction lens according to claim 1, wherein cover glass is provided on the object side of an image plane of the optical system, and
wherein the correction lens is disposed on an image side of the optical system and is disposed on an object side of the cover glass.

* * * * *